(12) United States Patent
Anderson et al.

(10) Patent No.: US 7,550,864 B2
(45) Date of Patent: Jun. 23, 2009

(54) WIND TURBINE

(75) Inventors: David Ewart Anderson, East Lothian (GB); Charles Lawrence Silverton, Edinburgh (GB)

(73) Assignee: Renewable Devices Swift Turbines Limited, Edienburgh (GB)

( * ) Notice: Subject to any disclaimer, the term of this patent is extended or adjusted under 35 U.S.C. 154(b) by 0 days.

(21) Appl. No.: 10/549,417

(22) PCT Filed: Mar. 18, 2004

(86) PCT No.: PCT/GB2004/001176

§ 371 (c)(1),
(2), (4) Date: May 16, 2006

(87) PCT Pub. No.: WO2004/083631

PCT Pub. Date: Sep. 30, 2004

(65) Prior Publication Data

US 2006/0244264 A1  Nov. 2, 2006

(30) Foreign Application Priority Data

Mar. 18, 2003  (GB) .................................. 0306075.3

(51) Int. Cl.
  *H02P 9/04*   (2006.01)
  *F03D 9/00*   (2006.01)
  *B63H 7/02*   (2006.01)
(52) U.S. Cl. ........................................ 290/55; 416/189
(58) Field of Classification Search ................... 290/55; 416/189

See application file for complete search history.

(56) References Cited

U.S. PATENT DOCUMENTS

| 104,918 | A | | 6/1870 | St. Clair ........................ 416/9 |
| 984,599 | A | * | 2/1911 | Pichault ...................... 417/250 |
| 1,433,995 | A | * | 10/1922 | Fowle ............................ 415/1 |
| 1,467,227 | A | * | 9/1923 | Capell ......................... 416/189 |
| 1,502,433 | A | * | 7/1924 | Johanson ..................... 415/4.1 |

(Continued)

FOREIGN PATENT DOCUMENTS

AU     2003205021     9/2003

(Continued)

OTHER PUBLICATIONS

Paul Gipe, "Noise From Small Turbines; An Unaddressed Issue", Wind-Works.org, http://www.wind-works.org/articles/noisewt.html, pp. 1-18, 2001.

(Continued)

*Primary Examiner*—Nicholas Ponomarenko
*Assistant Examiner*—Pedro J Cuevas
(74) *Attorney, Agent, or Firm*—Drinker Biddle & Reath LLP

(57) ABSTRACT

A rotor for a wind turbine comprising a plurality of radial blades and a ring-shaped aerofoil diffuser connecting the outer tips of the blades. Also disclosed is a wind turbine comprising said rotor and further comprising a nacelle and a mounting means adapted to allow rotation of the turbine and rotor about a directional axis perpendicular to the rotational axis, thus allowing the turbine to be oriented in the optimum direction depending on wind conditions. A furling means is disclosed to effect a change in orientation depending on wind speeds.

31 Claims, 18 Drawing Sheets

U.S. PATENT DOCUMENTS

| | | | | |
|---|---|---|---|---|
| 1,661,847 | A | | 3/1928 | Olson et al. .................... 416/12 |
| 1,944,239 | A | * | 1/1934 | Honnef ........................ 290/55 |
| 2,360,440 | A | * | 10/1944 | Muller et al. ............... 416/188 |
| 2,517,135 | A | * | 8/1950 | Rudisll ........................ 290/44 |
| 2,795,303 | A | * | 6/1957 | Muehlhause et al. .......... 52/121 |
| 2,876,585 | A | * | 3/1959 | Zaic ............................ 446/66 |
| 3,342,447 | A | | 9/1967 | Marsh ........................ 248/638 |
| 3,838,835 | A | * | 10/1974 | Kling ........................ 244/23 C |
| 3,924,966 | A | * | 12/1975 | Taminini .................... 416/177 |
| 4,021,135 | A | * | 5/1977 | Pedersen et al. ......... 415/208.2 |
| 4,075,500 | A | * | 2/1978 | Oman et al. .................. 290/55 |
| 4,080,100 | A | * | 3/1978 | McNeese .................... 416/189 |
| 4,086,498 | A | * | 4/1978 | Szoeke ........................ 290/55 |
| 4,118,636 | A | * | 10/1978 | Christian .................... 290/52 |
| 4,132,499 | A | * | 1/1979 | Igra ......................... 415/210.1 |
| 4,143,992 | A | * | 3/1979 | Crook ........................ 415/220 |
| 4,147,472 | A | * | 4/1979 | Kling ..................... 416/193 R |
| 4,159,191 | A | * | 6/1979 | Graybill ...................... 416/11 |
| 4,193,005 | A | | 3/1980 | Kos et al. ...................... 290/44 |
| 4,204,799 | A | * | 5/1980 | de Geus ...................... 415/4.5 |
| 4,289,450 | A | * | 9/1981 | Kling ........................ 416/192 |
| 4,324,985 | A | * | 4/1982 | Oman ........................ 290/55 |
| 4,334,823 | A | * | 6/1982 | Sharp ........................ 416/119 |
| 4,363,149 | A | | 12/1982 | Kondo et al. ................. 14/73.5 |
| 4,364,712 | A | * | 12/1982 | Charles ...................... 416/183 |
| 4,367,413 | A | | 1/1983 | Nair ............................ 290/52 |
| 4,377,812 | A | * | 3/1983 | Gobel et al. ................ 343/872 |
| 4,415,306 | A | * | 11/1983 | Cobden ...................... 415/4.5 |
| 4,469,956 | A | | 9/1984 | D'Amato .................... 290/55 |
| 4,501,089 | A | * | 2/1985 | Cobden ........................ 47/2 |
| 4,684,316 | A | * | 8/1987 | Karlsson ................. 415/211.1 |
| 4,720,640 | A | * | 1/1988 | Anderson et al. ............. 290/43 |
| 4,781,523 | A | * | 11/1988 | Aylor ...................... 415/218.1 |
| 4,863,350 | A | * | 9/1989 | Quarterman ............ 416/193 R |
| 5,221,186 | A | * | 6/1993 | Machin ........................ 416/61 |
| 5,425,619 | A | * | 6/1995 | Aylor ........................ 416/42 |
| 5,457,346 | A | * | 10/1995 | Blumberg et al. ............. 290/55 |
| 5,591,004 | A | * | 1/1997 | Aylor ........................ 416/42 |
| 5,599,172 | A | * | 2/1997 | McCabe .................... 417/334 |
| 5,632,599 | A | * | 5/1997 | Townsend .................... 416/42 |
| 5,669,758 | A | * | 9/1997 | Williamson .................... 416/4 |
| 5,707,209 | A | * | 1/1998 | Iyer et al. ............... 416/186 R |
| 5,743,712 | A | * | 4/1998 | Aylor ........................ 416/42 |
| 5,863,180 | A | * | 1/1999 | Townsend .................... 416/42 |
| 5,910,688 | A | | 6/1999 | Li ................................ 290/55 |
| 6,417,578 | B1 | * | 7/2002 | Chapman et al. .............. 290/44 |
| 6,452,287 | B1 | * | 9/2002 | Looker ........................ 290/55 |
| 6,616,402 | B2 | * | 9/2003 | Selsam ....................... 415/3.1 |
| 6,786,697 | B2 | | 9/2004 | O'Connor et al. ........... 416/189 |
| 6,806,586 | B2 | * | 10/2004 | Wobben ...................... 290/54 |
| 6,841,892 | B1 | * | 1/2005 | Le Nabour et al. ............ 290/43 |
| 6,849,965 | B2 | * | 2/2005 | Le Nabour et al. ............ 290/55 |
| 6,876,101 | B1 | * | 4/2005 | Knez ............................ 290/55 |
| 6,887,031 | B1 | * | 5/2005 | Tocher ......................... 415/1 |
| 6,952,058 | B2 | * | 10/2005 | McCoin ....................... 290/44 |
| 7,098,552 | B2 | * | 8/2006 | McCoin ....................... 290/44 |
| 7,109,599 | B2 | * | 9/2006 | Watkins ....................... 290/55 |
| 7,116,006 | B2 | * | 10/2006 | McCoin ....................... 290/54 |
| 7,214,029 | B2 | * | 5/2007 | Richter ....................... 415/4.5 |
| 7,220,096 | B2 | * | 5/2007 | Tocher ......................... 415/1 |
| 7,323,792 | B2 | * | 1/2008 | Sohn .......................... 290/55 |
| 7,479,709 | B2 | * | 1/2009 | Hsiung et al. ................. 290/55 |
| 7,481,615 | B2 | * | 1/2009 | Park ........................ 415/173.5 |
| 2002/0192068 | A1 | * | 12/2002 | Selsam ....................... 415/3.1 |
| 2008/0093861 | A1 | * | 4/2008 | Friesth et al. ................. 290/55 |
| 2008/0118357 | A1 | * | 5/2008 | Jeon et al. ................... 416/185 |
| 2008/0143117 | A1 | * | 6/2008 | Shen et al. .................... 290/55 |
| 2008/0258467 | A1 | * | 10/2008 | Wilson et al. ................. 290/54 |
| 2008/0286093 | A1 | * | 11/2008 | Bauer, Jr. .................... 415/146 |
| 2008/0315585 | A1 | * | 12/2008 | Marvin ....................... 290/44 |
| 2009/0008939 | A1 | * | 1/2009 | Pare et al. .................... 290/44 |

FOREIGN PATENT DOCUMENTS

| | | |
|---|---|---|
| DE | 9217043.9 | 2/1973 |
| DE | 9218214.3 | 9/1993 |
| EP | 0657647 | 6/1995 |
| EP | 1065374 A2 | 1/2001 |
| GB | 1175 | 0/1909 |
| GB | 213022 | 3/1924 |
| WO | WO 03/102411 | 12/2003 |

OTHER PUBLICATIONS

Zephry Corporation, "*AIRDOLPHIN The World's Best Performance with Small Wind Turbine*", http://www.zephyreco.co.jp/en/main_pro_airdolphin.htm, pp. 1-7, undated.

* cited by examiner

WIND TURBINE

The invention relates to wind turbines, and more particularly to a wind turbine for mounting on a roof and for use with a heating system (either domestic or commercial), energy storage system, electrical storage system or with a local or national electricity grid.

The UK government, under the Kyoto agreement, made a commitment to decrease $CO_2$ emissions by 10% by 2010 and the Scottish Executive have set even more stringent environmental targets. Accordingly, there has recently been emphasis on renewable sources of energy. Analysis of energy demands shows that 47% of the UK's annual energy demand is from buildings, which contributes 40% of the UK's $CO_2$ emissions. The technology of the present invention will provide substantial economic benefits to over 33% of buildings and could reduce the UK's $CO_2$ emissions by as much as 13%.

Existing turbines of a size suitable for mounting on a roof to provide power are designed for smooth airflow only and will oscillate violently with the compressed and turbulent airflow found over, and around, buildings, creating noise and inefficient generation.

It is an object of the present invention to overcome one or more of the aforementioned problems.

According to a first aspect of the invention there is provided a rotor for a wind turbine comprising a plurality of radial blades and a ring-shaped aerofoil diffuser connecting the outer tips of the blades.

Preferably the aerofoil diffuser extends downstream from the outer tips of the blades. The outer tips of the blades may be connected to the diffuser at or near to the leading edge of the diffuser.

Preferably the aerofoil diffuser tapers outwards from the outer tips of the blades to form a substantially frusto-conical diffuser, the rotational axis of the frusto-conical diffuser is substantially aligned to the rotational axis of the blades.

Alternatively, at least a portion of the aerofoil diffuser extends upstream from the outer tips of the blades, the aerofoil diffuser tapers radially outwards as it extends from the upstream end to the downstream end.

Preferably the aerofoil diffuser is shaped such that it inhibits the partially axial and partially radial airflow from the blades, said airflow becoming circumferential when it contacts the aerofoil diffuser. Further preferably the shape of the aerofoil diffuser is such that there is a resultant improvement in the aerodynamic and acoustic characteristics of the blade and diffuser assembly when in rotation.

Preferably the aerofoil diffuser is adapted to inhibit partly axial and partly radial airflow from the outer tips of the blades and divert said airflow to circumferential airflow during normal operation.

Preferably the blades are inclined at an angle relative to a transverse rotor plane perpendicular to the rotational axis of the rotor. The angle of inclination may vary along the length of the blade.

Preferably the angle of inclination of each blade is greater at an intermediate portion of the blade than at the outer tip of the blade. Preferably the blade is substantially parallel to the transverse rotor plane at the outer tip of the blade.

According to a second aspect of the invention there is provided a wind turbine comprising a rotor according to the first aspect. Preferably the wind turbine further comprises a nacelle and a mounting means adapted to allow rotation of the turbine and rotor about a directional axis perpendicular to the rotational axis. This allows the turbine to be oriented in the optimum direction depending on wind conditions.

Preferably the wind turbine further comprises a furling means adapted to rotate the rotor about the directional axis so that the rotational axis is not parallel to the direction of airflow when the airflow speed is greater than a predetermined airflow speed.

Preferably the furling means comprises a non-linear furling means adapted to provide no furling over a first lower range of airflow speed and a varying degree of furling over a second higher range of airflow speed. Preferably the furling means comprises at least two tail fins extending downstream of the diffuser. Preferably the furling means comprises two tail fins provided diametrically opposite each other, but more tail fins may be provided if required, providing the positions of the tail fins are balanced.

Preferably one of the tail fins is a moveable tail fin hingedly mounted for rotation about a tangential hinge line. The moveable tail fin may be mounted on a mounting boom and the hinge line may be provided: at the connection point of the mounting boom and the nacelle, so that the mounting boom also rotates; at the connection between the mounting boom and the moveable tail fin so that only the moveable tail fin rotates; or at any point along the length of the mounting boom.

Additionally or alternatively, the tail fin may rotate about a horizontal axis under high winds resulting in a fin which folds about a horizontal axis.

Preferably the moveable tail fin is rotationally biased by biasing means to an at-rest position in which the leading edge of the moveable tail fin is closer to the axis of rotation of the rotor than the trailing edge of the moveable tail fin, such that the moveable tail fin is angled at an at-rest attack angle to the axis of rotation of the rotor. The biasing means may be non-linear. Preferably the biasing means is adapted to hold the moveable tail fin in the at-rest position until the airflow speed reaches a predetermined speed. Preferably, as the airflow speed increases beyond the predetermined speed the moveable fin rotates and the attack angle decreases. This results in unbalanced aerodynamic loading on the wind turbine, so that the wind turbine rotates about its mounting axis to a furled position.

According to a third aspect of the present invention there is provided a wind turbine system comprising:

a wind turbine driven generator and means for providing a power output.

Preferably the system further comprises an electronic control system.

Preferably the system comprises a dump element comprising one or more energy dissipaters. The energy dissipaters may be in the form of resistive elements.

Preferably the dump element is in the form of a liquid storage vessel having electrical heating elements therein adapted to heat liquid in said storage vessel.

Preferably the control means may be adapted to supply electrical power to said one or more electrical heating elements when the power from the wind turbine exceeds a predetermined power. In one embodiment the liquid storage vessel is a cold water tank and the liquid is water. In another embodiment the heating element is a radiator.

Preferably this dump element is activated by the electronic control system when the power available from the wind exceeds the power take-off due to a loss or reduction of electrical load caused by the switching off, reduction or separation of the said electrical load.

Preferably said dump element is activated when the rotor speed increases above a defined "dump on" rotor speed caused by the imbalance of wind turbine rotor torque and wind turbine generator torque. The said wind turbine rotor torque is dependent on wind speed and the said wind turbine generator torque is dependent on the electrical load.

Further, said dump element serves to increase the wind turbine generator torque above the wind turbine rotor torque reducing the wind turbine rotor speed until it approaches or reaches an aerodynamic stall. The dump load is then released when the wind turbine rotor speed falls below a defined "dump off" rotor speed. The said "dump on" and "dump off" rotor speeds are defined proportionally to the power take-off thus reducing the generator torque.

Preferably, the wind turbine system according to the present invention is provided with a control means in order to control the level of power taken from the wind turbine. For efficiency reasons the maximum power take-off from the wind turbine is approximately 60%, as given by the Betz limit. The control system is adapted to increase or decrease the power take-off from the wind turbine by a small amount and temporarily set the power take-off at this level. After a certain time period, the control system will measure the rotor speed of the wind turbine again and thus calculate the acceleration of the rotor. Additional measurements of rotor speed are then made after additional time periods. These are used to calculate the first, second and third order values, namely speed, acceleration/deceleration and the rate of change of acceleration/deceleration, to the said increase or decrease in power take-off. A combination of the said first, second and third order values determines a change in the existing power take-off and the amount of power taken from the wind turbine is again adjusted. The above steps are repeated continuously.

Preferably the system comprises a wind turbine according to the first or second aspects of the invention.

The power output may be connected to a heating system further comprising a further liquid storage vessel, one or more electrical heating elements adapted to heat liquid in said further vessel, and control means adapted to control the supply of electricity generated by said generator to said one or more electrical heating elements.

Preferably the further liquid storage vessel is a hot water tank and the liquid is water.

Additionally or alternatively, the heating system comprises a plurality of electrical heating elements, and the control means is adapted to supply electrical power to a proportion of the electrical heating elements, the proportion being dependent upon the instantaneous electrical power generated by the generator.

Preferably the heating element in the further liquid vessel is enclosed by means of a tube. This tube is open on the underside thereof in order to allow water to flow from beneath the tube towards the heating element. The tube will enclose and extend over in essence the entire length of the heating element. The water near the heating element will be heated and will flow upwards due to natural convection. The presence of the tube will direct the heated water towards a zone near to or at the top of the vessel. The presence of the tube will enable the formation of different and separate thermally stratified heat zones within the further liquid storage vessel.

Alternatively or additionally, the power output may be connected to a grid-tie inverter or stand alone inverter. Preferably the inverter is adapted to supply power to local or grid power infrastructure.

Alternatively or additionally, the power output may be connected to an energy storage system.

According to a fourth aspect of the present invention there is provided a method of controlling the level of power taken from a wind turbine comprising the following steps taken by a control means:

(a) increasing or decreasing the power take-off from the wind turbine by a small amount;

(b) temporarily setting the level of power take-off;

(c) after a predetermined time period, taking a number of measurements of the rotor speed;

(d) calculating the first, second and third order values, namely speed, acceleration/deceleration and rate of change of acceleration/deceleration respectively, to the said increase or decrease in power take-off;

(e) adjusting the power taken from the wind turbine in response to the calculation.

Preferably steps (b) to (e) are repeated continuously.

Preferably the control means uses the following logic to determine the adjustment:

(a) IF: there is a positive second order rotor speed response (acceleration) and an increasing rate of said acceleration (positive third order response) of the rotor speed; THEN: the control means causes an increase in the power take-off; OR (b) IF: there is a positive second order rotor speed response (acceleration) and decreasing rate of said acceleration (negative third order response) of the rotor speed; THEN: the control means causes an increase or alternatively no change in the power take-off; OR (c) IF: there is a negative second order rotor speed response (deceleration) and increasing rate of said deceleration (positive third order response) of the rotor speed; THEN: the control means causes a reduction in the power take-off; OR (d) IF: there is a negative second order rotor speed response (deceleration) and decreasing rate of said deceleration (negative third order response) of the rotor speed; THEN: the control means causes an increase or alternatively no change in the power take-off.

Preferably the control means repeats the above steps to continue adjusting the power-take-off to ensure that the power take-off is always maximised to the power available to the wind turbine which is dependent on the local wind speed at the rotor plane.

According to a fifth aspect of the invention there is provided a wind turbine according to the second aspect comprising means for reducing the operating vibrations caused by harmonic resonance within the turbine, tower and mounting structure.

Preferably the wind turbine is provided with a nacelle damping system. The nacelle damping system according to the invention will help to isolate the vibrations in the generator and turbine from the tower.

Preferably the wind turbine is provided with mounting brackets for mounting the turbine on a surface, the brackets having a sandwich construction of visco-elastic materials and structural materials.

The mounting means can be of any cross-sectional shape, but is typically tubular. Preferably, the tower contains one or more cores of flexible material, such as rubber, with sections with a reduced diameter, which are not in contact with the tower's inner radial surface. These reduced diameter sections alternate with normal sized sections, which are in contact with the tower's inner surface.

This serves to absorb vibrations in the tower through the energy dissipated in the flexible core before they reach the mounting brackets. The rubber core thereby acts to control the system's resonant is frequency out-with the turbine driving frequency by absorption of a range of vibration frequencies. By altering the cross-sectional shape and length of each of the reduced diameter sections, the system can be "tuned" to remove a range of vibration frequencies from the mounting structure.

The sandwich mounting brackets compliment the mounting means core design and suppress vibrations that come from the nacelle. The nacelle itself supports the generator through bushes designed to eliminate the remaining frequencies. These three systems act as a high/low pass filter where the only frequencies that are not attenuated are those out-with the operating range of the turbine.

Embodiments of the present invention will now be described with reference to drawings wherein.

Figure 1A:
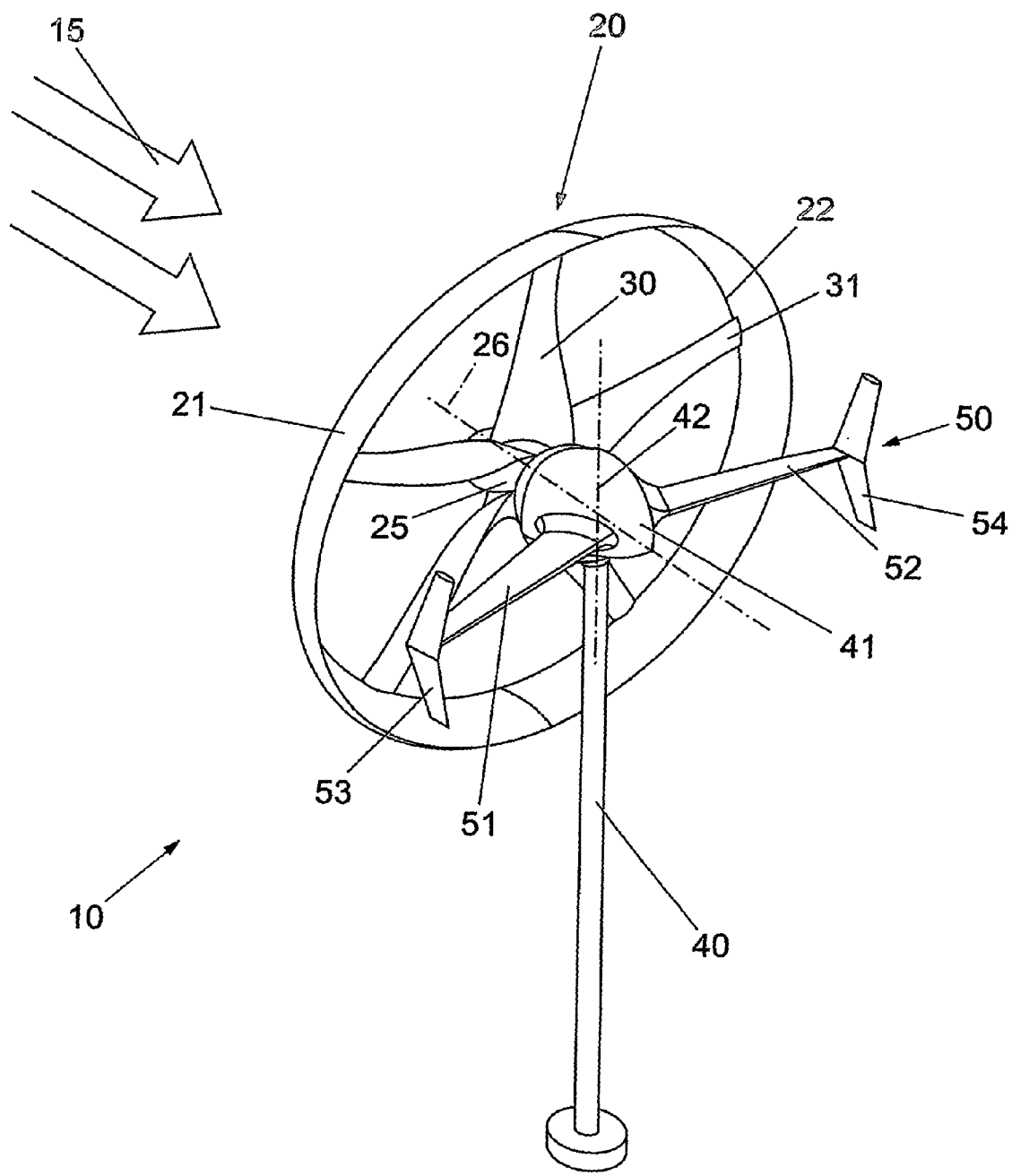
FIGS. 1A and 1B show schematic views of two embodiments of the wind turbine according to the present invention.
Figure 1B:
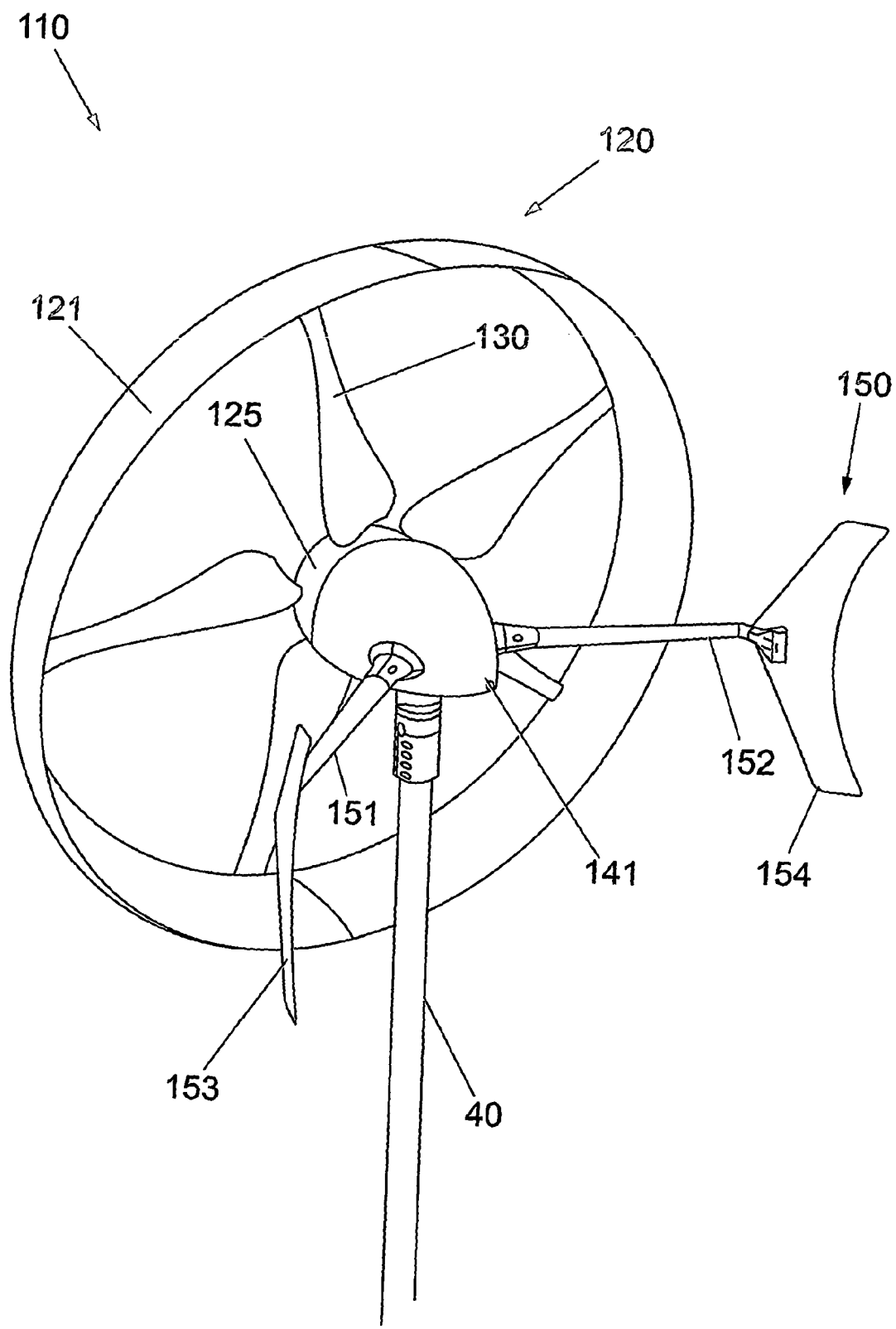
Figure 2A:
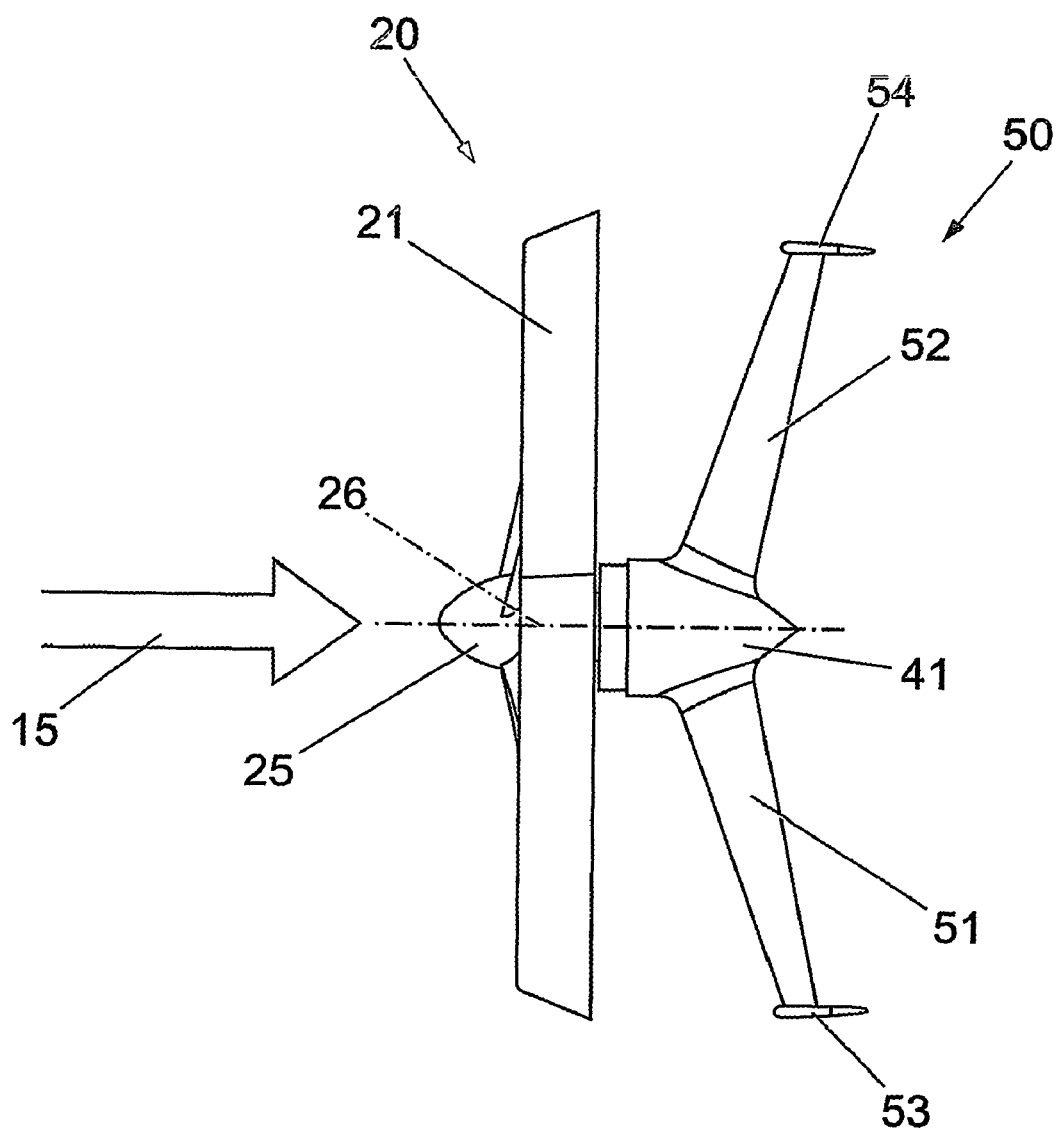
FIGS. 2A and 2B show top views of two embodiments of the rotor and the furling device of the wind turbine according to FIGS. 1A and 1B respectively.
Figure 2B:
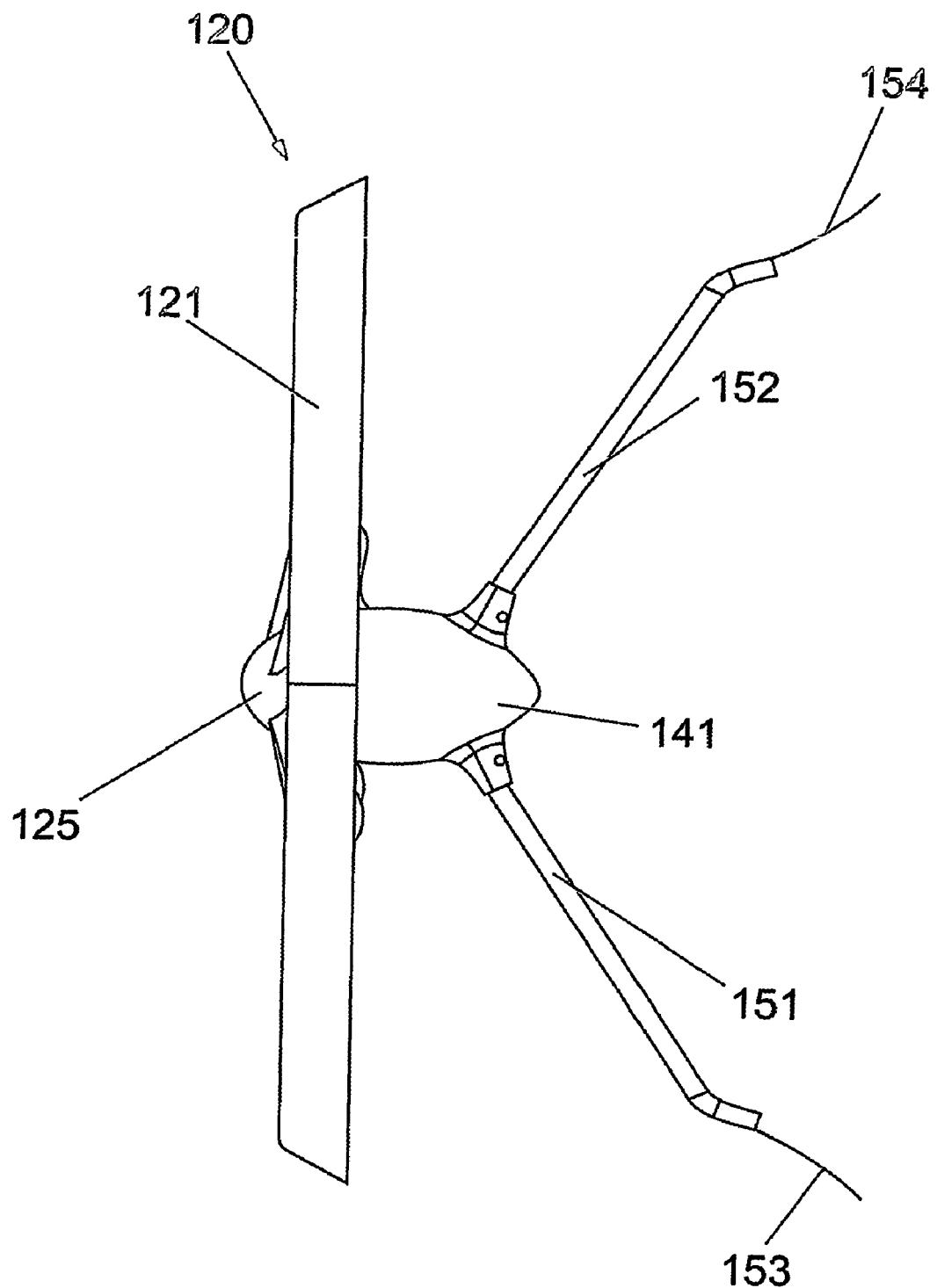

In FIGS. 1A and 1B are shown possible embodiments of the wind turbine 10,110 according to the present invention is shown. The wind turbine 10,110 comprises a rotor 20,120 having a core 25,125 and radial blades 30,130 extending from the core 25,125 towards the outer tip 31 of the blades 30,130. The rotor comprises a radial aerofoil 21,121, attached to and encircles the rotor blades 30,130. The rotor 20,120, by means of the core 25,125, is rotationally fixed to a nacelle 41,141. The rotor 20,120 is able to rotate about the rotational axis 26. The nacelle 41,141 is rotationally mounted on top of mounting means 40. The mounting means 40 allow the wind turbine 10,110 to be fixed on a support (not shown). The nacelle 41,141 moreover is provided with a furling mechanism 50,150. The furling mechanism 50,150 comprises a first boom 51,151 and a second boom 52,152. The booms 51,151; 52,152 and their respective ends thereof are provided with tail fins 53,153;54,154.

The furling mechanism 50,150 has two functions. The first function is to keep the rotational axis 26 of the rotor 20,120 essentially parallel to the momentaneous direction of the airflow. In FIG. 1 the airflow is schematically indicated by means of arrows 15. The second function of the furling device 50,150 is to rotate the rotor 20,120 out of the wind when the wind velocity exceeds the output power requirements of the wind turbine or endangers the system's integrity, in order to protect the wind turbine 10,110 against unacceptably high loads. The construction and the working of the furling mechanism will be clarified below, with reference to FIGS. 2A, 2B, 3, 4, 5A and 5B.

It is to be understood that whilst the remaining description relates to the embodiment of FIG. 1A, the description applies equally to the embodiment of FIG. 1B.

As shown in FIG. 1, the radial aerofoil 21 is attached to and encircles the turbine blades 30. The radial aerofoil 21 will create a slight venturi effect near the blade tips where the resulting increase in air velocity has the largest effect on the power output of the turbine. This increases the overall efficiency of the turbine 10, which compensates for the slight increase in weight and aerodynamic drag caused by the addition of the aerofoil 21. The aerofoil will also create a more laminar flow along the rotor blades. This is important since the airflow on a roof typically is turbulent. A further advantage is the fact that the presence of the radial aerofoil 21 will increase the mechanical strength of the rotor 20, allowing more efficient aerofoil section to each blade 30. A further advantage is the fact that the presence of the radial aerofoil 21 results in a reduction in the acoustic emissions (noise) from the spinning turbine rotor blades 30 due to the fact that noise including aerodynamic vortex shedding is eliminated or reduced. The presence of the radial aerofoil 21 also helps to reduce the effect of turbulent airflow through the rotor plane, and in this way also assists in reducing the acoustic emissions.

In FIG. 1 it can be seen that the design of the blade 30 is such that the outer tips 31 of the blade 30 are in essence perpendicular to the rotational axis 26.

The outer tips 31 of the blade are connected near the leading edge 22 of the aerofoil 21. The number of blades 30 may be varied. The aerofoil 21 may be positioned to extend in an upstream or downstream orientation with respect to the blades 30.

In FIG. 2 a top view is shown of the rotor 20 and the furling device 50 of the wind turbine 10 according to FIG. 1. The furling device 50 comprises booms 51,52 each provided with a tail fin 53,54 at the end thereof. The airflow 15 will exert a certain pressure on the tail fins 53,54. The tail fins will balance and stabilise the position of the rotor 20 with respect to the direction of the airflow 15. When the direction of the airflow 15 changes the resulting pressure on the tail fins 53,54 will also change. The resulting force will cause the rotor 20 to rotate in order to maintain the direction of the airflow 15 in essence in line with the rotational axis 26 of the rotor 20. During normal furling the presence of the aerofoil 21 will reduce vibrations caused by imbalanced blade tip vortex shedding. This is achieved in that the aerofoil will act to divert the airflow from the blade tips during furling.

The furling device 50 according to the present invention not only maintains an optimal angle between the rotor 20 and the airflow 15, but in addition acts to protect the turbine 20 during excessively high wind loadings. The furling device 50 is designed to rotate the turbine (rotor) 20, about axis 42, out of the airflow when the wind velocity exceeds the output power requirements of the turbine or when the wind loading compromises the integrity of the rotor 20 or other turbine components. As shown in FIG. 2, the tail fins 53,54 form a wedge pointing into, out of substantially parallel to the wind. Excessive wind loadings will make the tail fins 53,54 move and/or rotate with respect to the nacelle 41. Preferably one of the fins has no travel or limited travel, causing the rotor 20 to furl (or rotate) about axis 42 as the second fin continues to rotate under high airflow velocities. It means that the furling mechanism so according to the present invention under moderate wind velocity will keep the rotor 20 in a stable condition and at a preferred angle with respect to the airflow 15. Only after exceeding a predetermined wind velocity, the same furling device 50 will cause the rotor 20 to rotate out of the wind in order to protect the integrity thereof.

The construction of the furling device 50 according to the present invention causes the furling device to act non-linearly in relation to the wind velocity. The furling device 50 limits the turbine's susceptibility to gusts and turbulence. Light gusts will not be able to move the rotor out of the wind. The safety function of the furling device 50 will only operate in high wind situations in order to protect the turbine and a respective generator.

As shown in FIG. 2 the booms 51 and 52 extend from the nacelle to the tail fins, in the downwind direction of the rotor 20. The respective tail fins 53 and 54 are positioned essentially in line with the exterior dimensions of the rotor 20. The construction of the furling device 50 according to the present invention enables a compact construction and does not necessitate free space behind the nacelle 41. That means that the design of this furling system allows the overall length of the turbine to be considerably reduced when compared to existing wind turbines.

Figure 3:
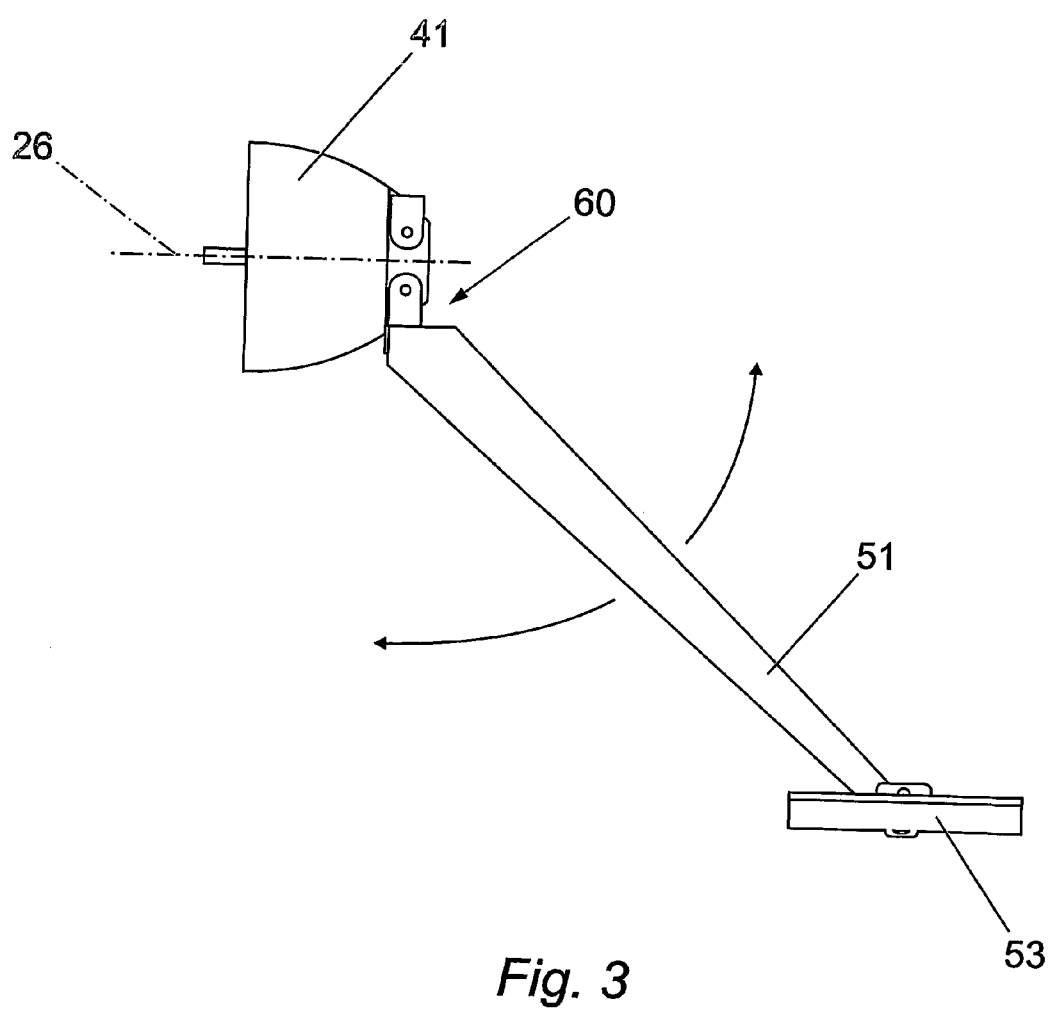
FIG. 3 shows in detail an embodiment of one boom of the furling device according to the present invention.
Figure 4:
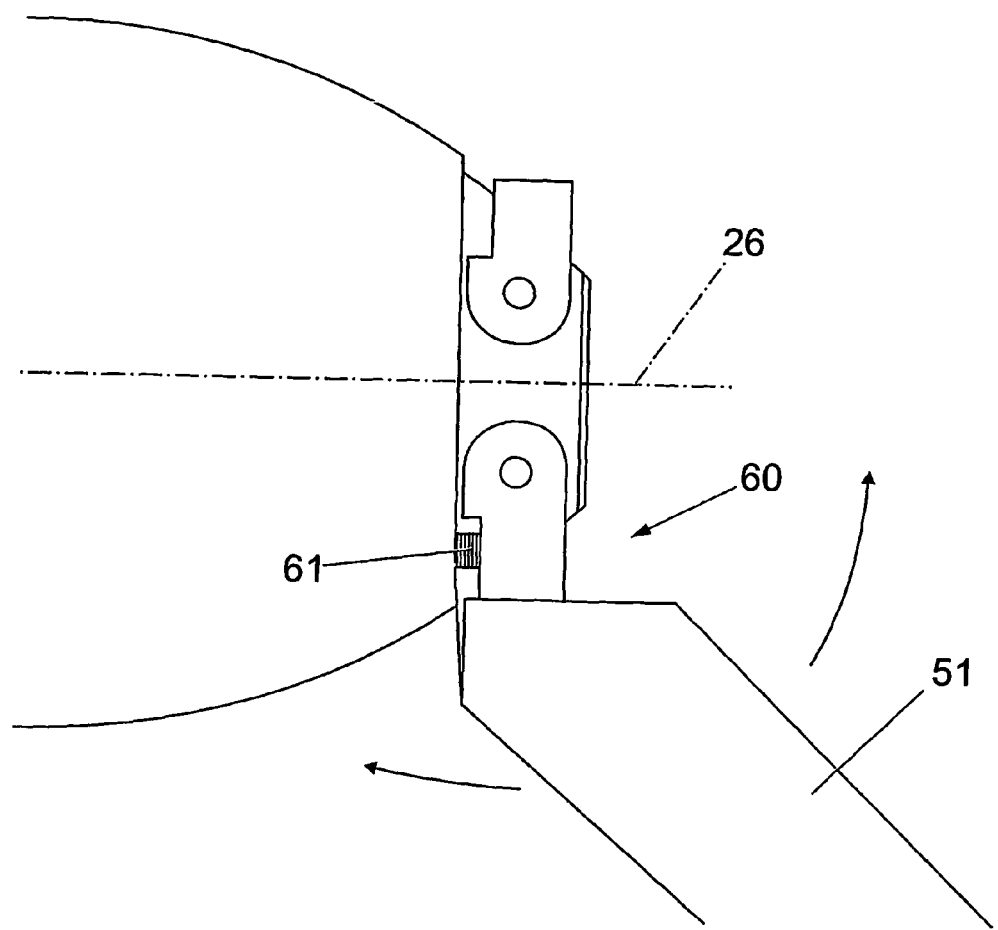
FIG. 4 shows the connection of the boom according to FIG. 3 through the nacelle.

In FIGS. 3 and 4 the first embodiment of the boom 51 and respective tail fin 53 is shown. The arrows indicate the movement of the boom 51 with respect to the nacelle 41. The angle between the rotation axis 26 of the rotor (not shown) and the tail fin 53 is changed by use of a hinge 60 located at the base of the boom 51. As shown in FIG. 4, the boom 51 is held at a fixed angle to axis 26 by a coil spring 61. When the wind loading on the fin 53 is sufficiently large, the boom 51 and the fin 53 rotate against the retaining force of the coil spring 61, causing an out of balance aerodynamic loading on the rotor 20. This out of balance force will cause the nacelle to rotate about its mounting axis 42 (see FIG. 1). It should be noted that the coil spring 61 as shown in FIG. 4 is simply for explanatory purposes and any type of spring could be used in the hinge 60.

Figure 5A:
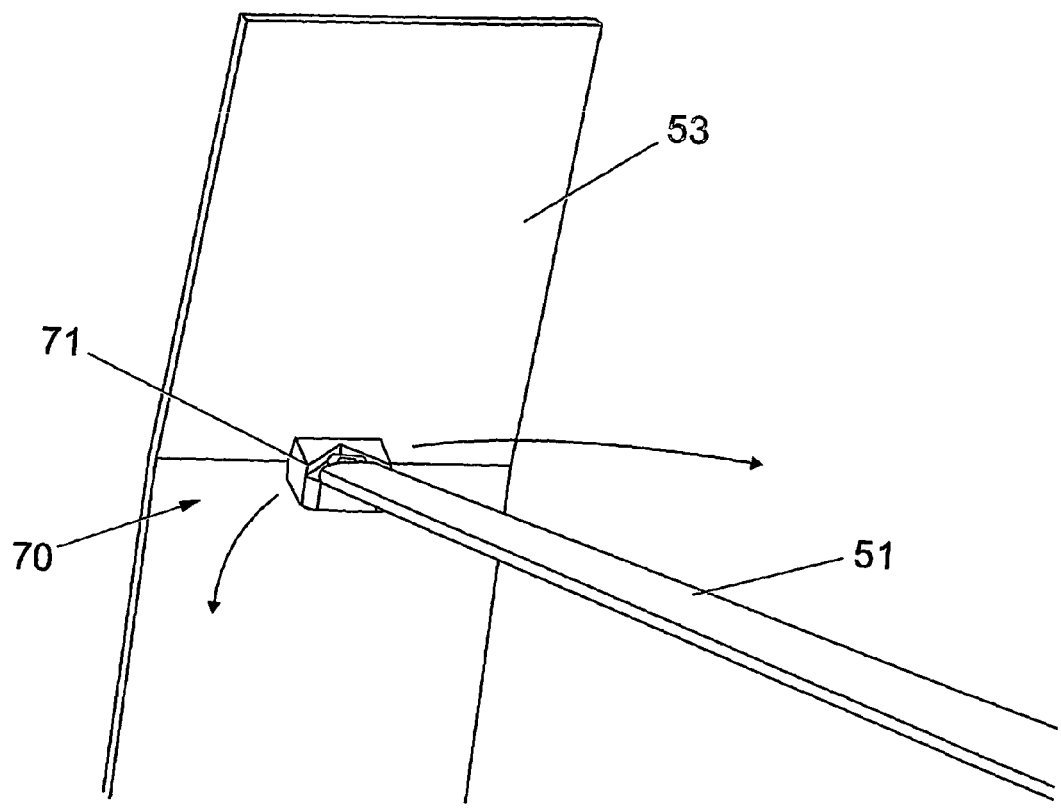
FIGS. 5A and 5B show the connection of the tip of the boom to the tail fin.
Figure 5B:
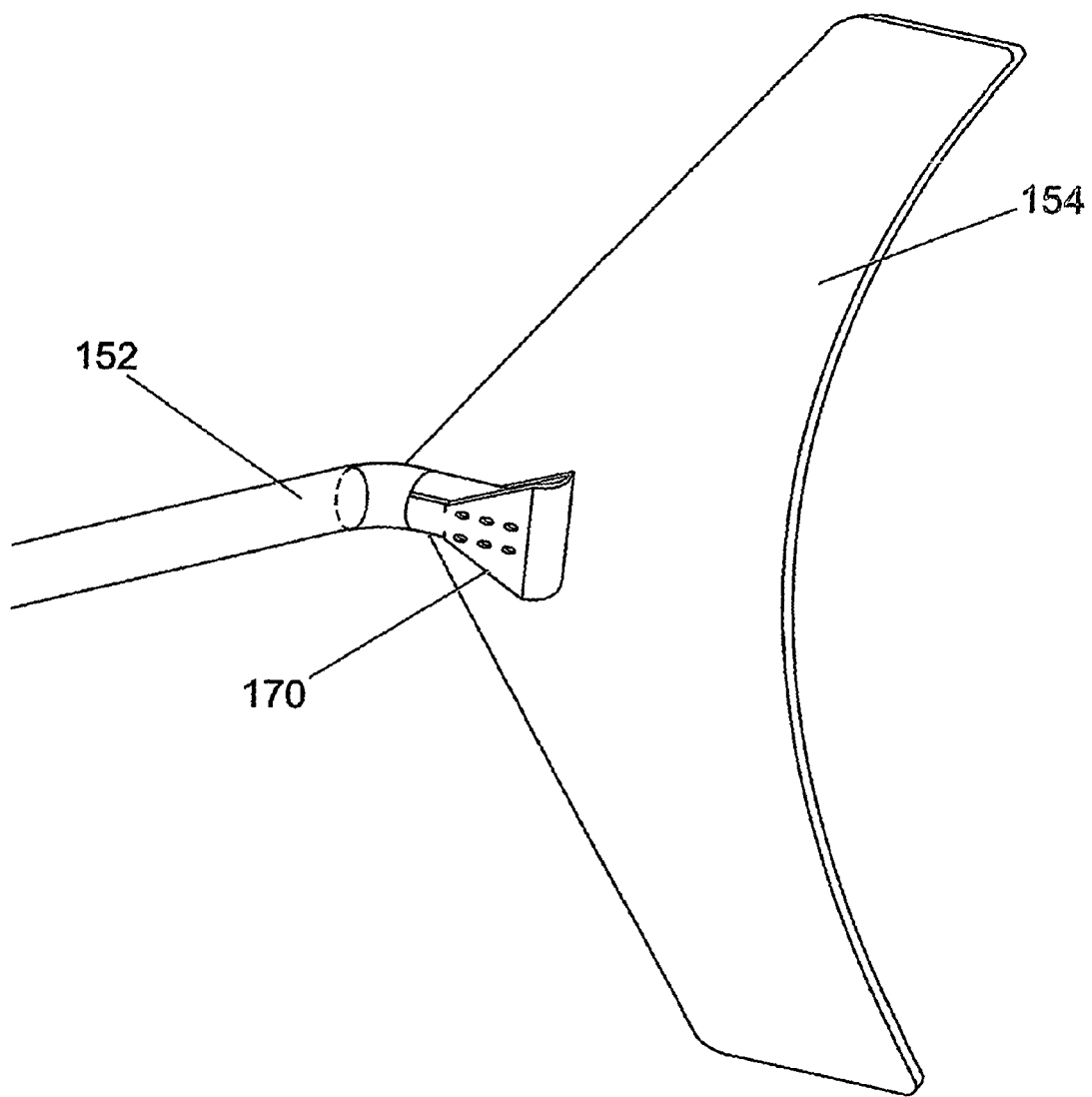

In FIG. 5A an alternative embodiment is shown wherein the rotation of the furling fin takes place about a hinge 70 located at the outer tip of the boom. In a further preferred embodiment, the hinge is a sprung hinge 170 as shown in FIG. 5B. As shown in FIG. 5 clockwise rotation of the fin 53 at the hinge 70 is limited by an end stop 71. The anti-clockwise rotation of the fin 53 is restrained by the reaction of a coil spring (not shown) or the sprung hinge 170. When the speed of the airflow 15 increases to a level at which furling is required, the retaining force of the spring in the hinge 70 or the sprung hinge 170 is overcome and the fin 53 (or in the alternative preferred embodiment the fin 154) will rotate. This causes an out of balance aerodynamic loading on the rotor. This out of balance force will again cause the nacelle to rotate about its mounting axis 42, until the aerodynamic forces on the turbine are in equilibrium. The non-linear furling mechanism 50 according to the present invention will keep the turbine windward and stable until the wind velocity compromises the systems safety and the turbine is progressively yawed from the wind. The furling device 50 therefore reduces constant yawing of the turbine during gusts, which would otherwise create unwanted oscillations and turbine blade noise.

It is to be understood that whilst there is described embodiments whereby the hinging feature is located at extreme ends of the boom 51,52, the hinge could be provided at any point along the boom 51,52.

Additionally or alternatively, the fin 53 or 54 can be arranged to fold along their horizontal axis thus causing the imbalance in that way.

The actual furling angle necessary to protect the wind turbine can be limited because of the presence of the aerofoil 21. A certain furling of the rotor 20 will result in aerodynamic stalling along the foil 21 and/or blades 30. As soon as the stalling starts, the power of the wind flow 15 on the rotor 20 will drop.

Figure 6:
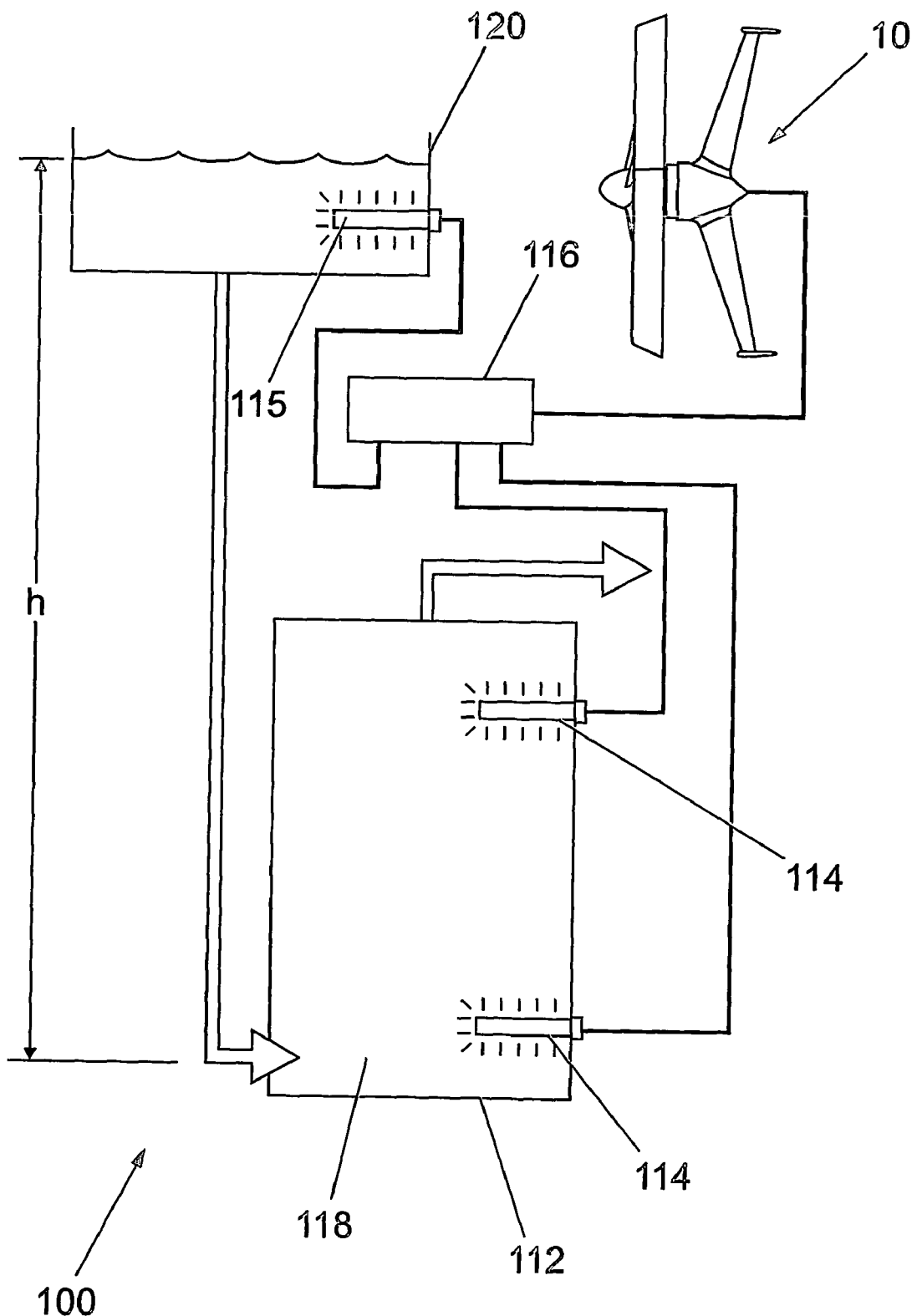
FIG. 6 shows a schematic overview of a heating device for heating water which is adapted to be coupled to a wind turbine according to the present invention.

In FIG. 6 a schematic overview of a wind turbine heating system is shown. The wind turbine heating system comprises a first water reservoir 118. In the water reservoir one or more electric heating elements 114 are provided. The electrical heating elements 114 are coupled with the wind turbine 10 via a control unit 116. The electrical current generated by the wind turbine 10 will be directed to the electrical heating elements 114 in order to heat up the water contained in reservoir 118. While the efficiency of the heat transfer for electric heating elements may be considered to be near 100%, operating an element at a lower power input than that for which it was designed results in a lower element temperature. The nature of wind power is such that the power output will usually be considerably below the overall rated power of the heating system. As such, it is necessary to use heating elements 114 with an appropriate power rating.

The water reservoir 118 is designed to store warm water, prior to use. The reservoir 118 may be a cylinder manufactured from copper alloy but any shape of cylinder or any material may be used such as enamelled steels and plastics. Steel cylinders are better suited to higher pressure applications, while copper is attractive due to its inherent corrosion resistance and the associated long service-life. For vented systems and their associated lower cylinder pressure, copper cylinders are well suited.

When, using the system according to FIG. 6, all of the water in the reservoir 118 has been heated to the maximum allowable temperature, the control unit 116 will no longer allow the heating elements 114 to dissipate power into the water reservoir 118. That means that the power generated by the wind turbine has to be "dumped" elsewhere (dump element). As long as the wind turbine 10 is generating electricity, it is essential that there is a means of dissipating the electrical energy at all times.

This dump element is activated by the electronic control system turning the said dump element "on" when the power available from the wind exceeds the power take-off due to a loss or reduction of electrical load caused by the switching off, reduction or separation of the said electrical load. The said element is triggered by an increased rotor speed above a defined "dump on" rotor speed caused by the imbalance of wind turbine rotor torque and wind turbine generator torque. The said wind turbine rotor torque is dependent on wind speed and the said wind turbine generator torque is dependent on the electrical load. The said dump element serves to increase the wind turbine generator torque above the wind turbine rotor torque reducing the wind turbine rotor speed until it approaches or reaches a stall. The generator torque is then reduced by releasing the dump load when the wind turbine rotor speed falls below a defined "dump off" rotor speed. The said "dump on" and "dump off" rotor speeds are defined proportionally to the power take-off and electrical load.

Water heated in a hot water reservoir 118 with elements 114 will tend to form stratified layers. The temperature within each layer will not vary much as heat will be spread by conduction and convection. A high temperature gradient exists between layers. This phenomenon would be useful in a situation where several heating elements are used, as the top layer could be heated up, and then left undisturbed by the convection below it as lower layers were subsequently heated.

It should be noted that the heating element design described herein could be used with or without a mains connection in tandem. The mains connection would allow the immersion heating element (or a dedicated mains element) to provide energy when none is available from the wind turbine.

With respect to the efficiency of the wind turbine, the power extracted from the wind by the rotor should be limited to approximately 60% (59,6%). Because of the fact that the wind turbine according to the present invention can be operated in turbulent airflows, the efficiency of the wind turbine according to the present invention can be improved by adding a new control system.

Figure 7:
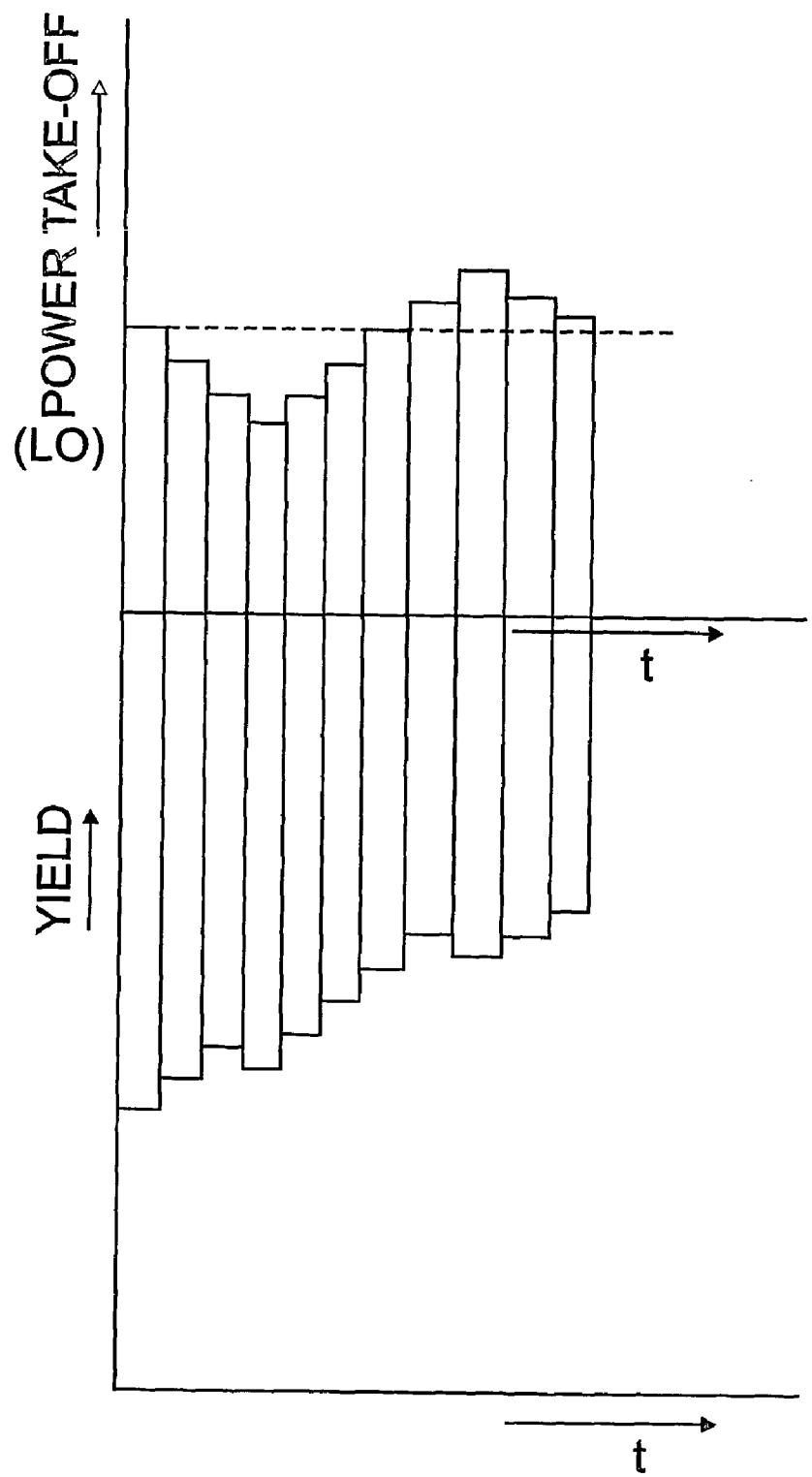
FIG. 7 shows diagrammatically the working of the control system of the heating device according to FIG. 6.

FIG. 7 schematically shows the working of the control system according to the present invention. First, the load on the wind turbine is near a predetermined starting level (L0). Multiple measurements of rotor speed are made after defined time periods. These measurements are used to calculate the first, second and third order values to the said increase or decrease on power take-off. The said first, second and third order values determining a change in the existing power take-off and the amount of power taken from the wind turbine is again adjusted.

The method of controlling the level of power taken from a wind turbine comprises the following steps taken by the control means:
  (a) increasing or decreasing the power take-off from the wind turbine by a small amount;
  (b) temporarily setting the level of power take-off;
  (c) after a predetermined time period, taking a number of measurements of the rotor speed;
  (d) calculating the first, second and third order values, namely speed, acceleration/deceleration and rate of change of acceleration/deceleration respectively, to the said increase or decrease in power take-off;
  (e) adjusting the power taken from the wind turbine in response to the calculation.

Steps (b) to (e) are then repeated continuously.

The control means uses the following logic to determine the adjustment:
  (a) IF: there is a positive second order rotor speed response (acceleration) and an increasing rate of said acceleration (positive third order response) of the rotor speed; THEN: the control means causes an increase in the power take-off; OR
  (b) IF: there is a positive second order rotor speed response (acceleration) and decreasing rate of said acceleration (negative third order response) of the rotor speed; THEN: the control means causes an increase or alternatively no change in the power take-off; OR
  (c) IF: there is a negative second order rotor speed response (deceleration) and increasing rate of said deceleration (positive third order response) of the rotor speed; THEN: the control means causes a reduction in the power take-off; OR
  (d) IF: there is a negative second order rotor speed response (deceleration) and decreasing rate of said deceleration (negative third order response) of the rotor speed; THEN: the control means causes an increase or alternatively no change in the power take-off.

The control means repeats the above steps to continue adjusting the power take-off to ensure that the power take-off is always maximised to the power available to the wind turbine, or yield, which is dependent on the local wind speed at the rotor plane.

Because of the fact that the wind velocity on the rotor will be continuously varying, the time interval for increasing and decreasing the amount of load on the wind turbine will typically be in the ranges of milliseconds to tens of seconds.

Figure 8A:
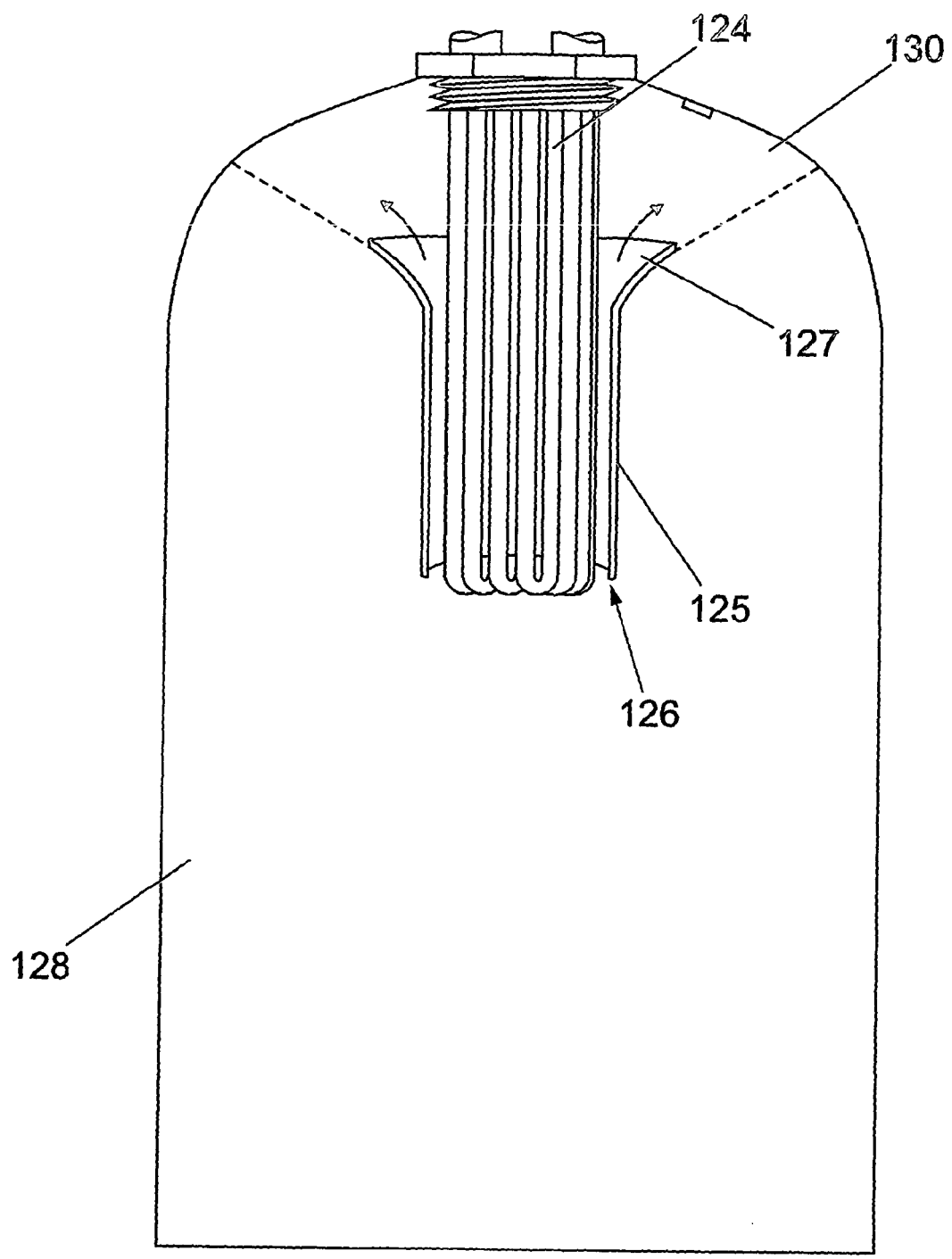
FIGS. 8A, 8B and 9A, 9B show a further embodiment of a heating device for heating water, which is adapted to be connected to the wind turbine according to the present invention.
Figure 8B:
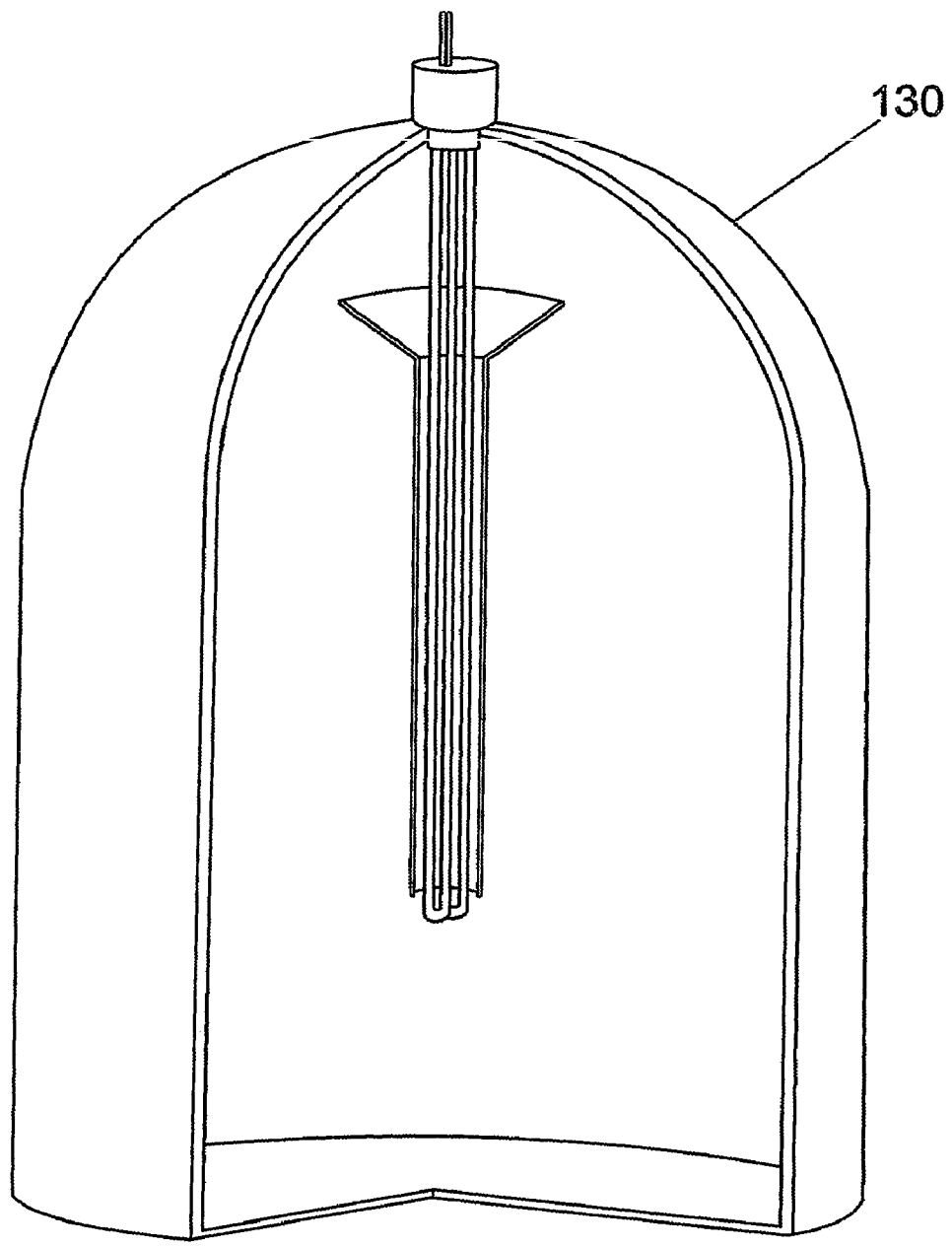

The efficiency of the wind turbine heating system can be further increased when using an alternative water reservoir 128 as shown in FIG. 8. The water reservoir 128 is provided with an electrical heating element 124. The heating element 124 is covered, over a substantive length thereof, by means of an enclosing tube 125. The bottom end 126 of the tube 125 is open. This enables water to flow in between the exterior of the heating device 124 and the interior of the tube 125. As soon as current passes through the element 124 the electrical energy will be converted into heat energy and this heat energy is then transferred to the water. The water film directly enclosing the heating element 124 will be heated and, due to natural convection, will flow towards the top of the reservoir 128 and is prevented from diffusing radially into the reservoir 128. Because of the presence of the tube 125 the heated water is directed towards a warm water zone 130 in a top part of the reservoir 128. The heat generated by the heating element 124 therefore is concentrated in the top part of the reservoir 128 and is prevented from diffusing radially into the reservoir 128. This will limit the time necessary to heat up water to a preferred temperature thus reducing the energy consumption of thereof.

Figure 9A:
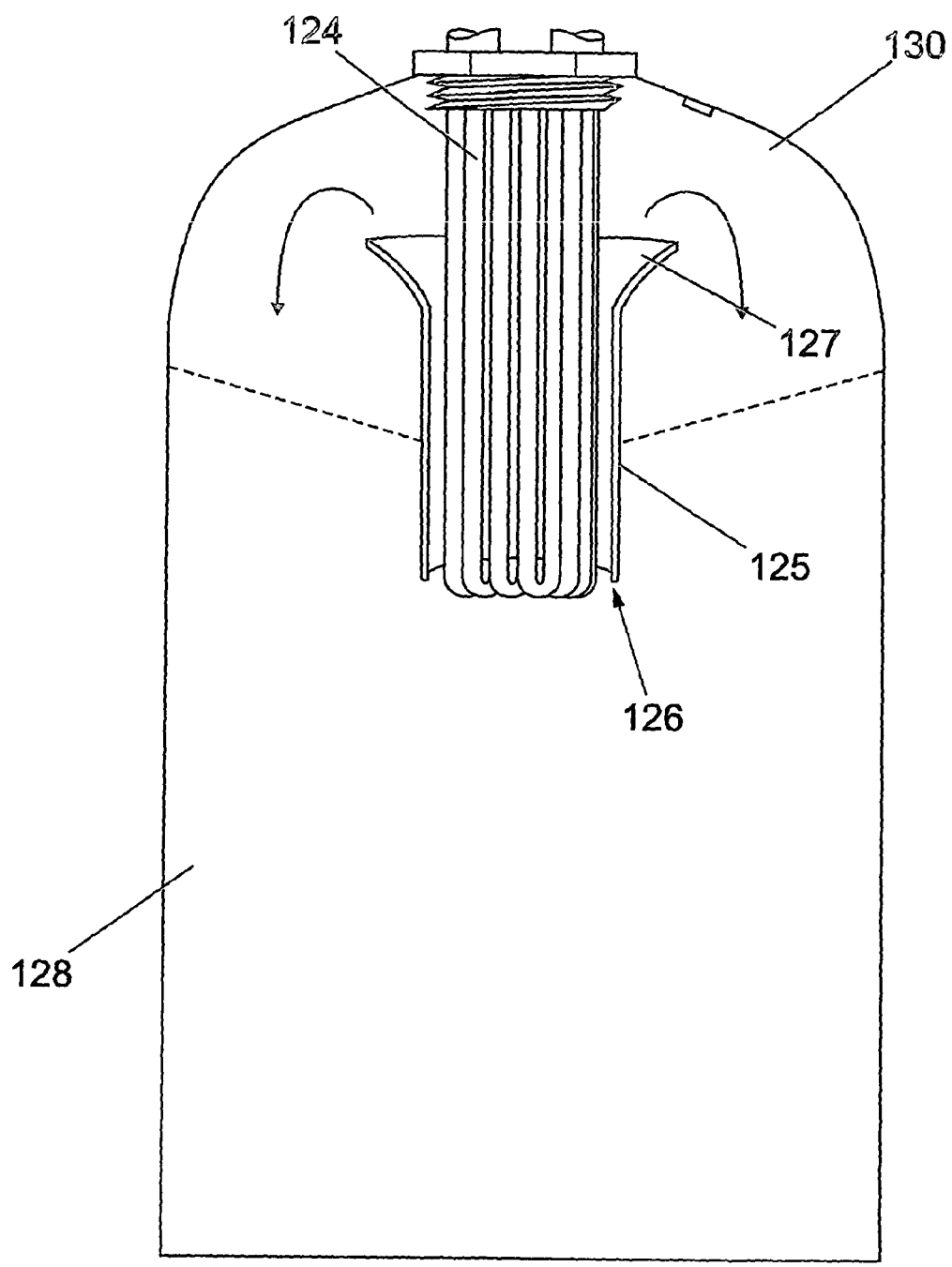
Figure 9B:
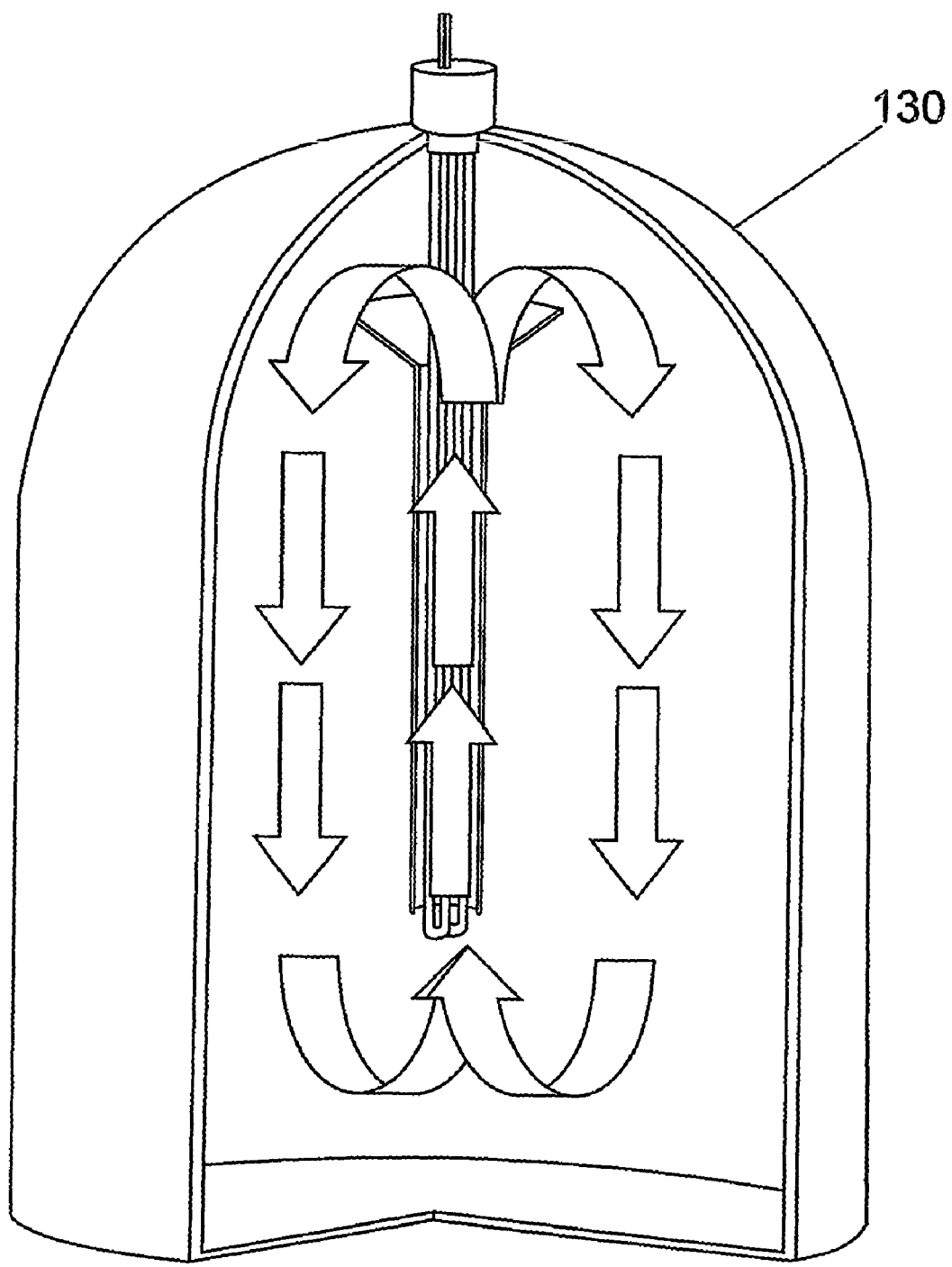

As soon as the power generated by the wind turbine is increased, the amount of heat transferred to the water in the reservoir 128 is also increased. This means that the flow of heated water towards the top part of the reservoir 128 will increase, resulting in mixing the thermally stratified layers, and in an enlarged warm water area 130. This effect is shown in FIG. 9. Because of the construction of the reservoir 128, power no longer has to be "dumped". The use of the reservoir 128 is especially suitable for a wind turbine, because of the fact that the nature of wind power is such that the power output will usually fluctuate and moreover will be below the overall rated power of the heating system.

During normal operation of a wind turbine according to the invention, vibrations are caused by harmonic resonance within the turbine, tower and mounting structure. These come from blade imbalances, due to deformation during operation, aerodynamically induced vibrations or mechanically induced vibrations in the rotor, generator or other turbine components. Eliminating resonance in micro-wind 4 turbines is especially difficult as they operate through a wide range of turbine tip-speeds. The design described below reduces the operating vibrations by controlling the turbine tip-speeds so that they remain outside natural resonant frequencies, and through novel vibration absorption measures.

Mounting a horizontal axis wind turbine on a building structure requires the damping of critical frequencies and the moving of harmonics beyond the system operating frequencies. The damping system on the rooftop wind turbine is integrated into the design of the mounting means and nacelle of the turbine. These vibration absorbing systems work together to create a silent running rooftop turbine.

The novel wind turbine mounting bracket uses a sandwich construction of viscoelastic materials and structural materials.

The mounting means tower contains an innovative core, typically of rubber, which has some sections which have a reduced cross-sectional area and are not in contact with the mounting means' inner surface and some sections which are. This serves to absorb vibrations in the mounting means through the energy dissipated in the rubber core before they reach the mounting bracket. The rubber core also acts to force the system's resonant frequency above the turbine driving frequency.

Figure 10:
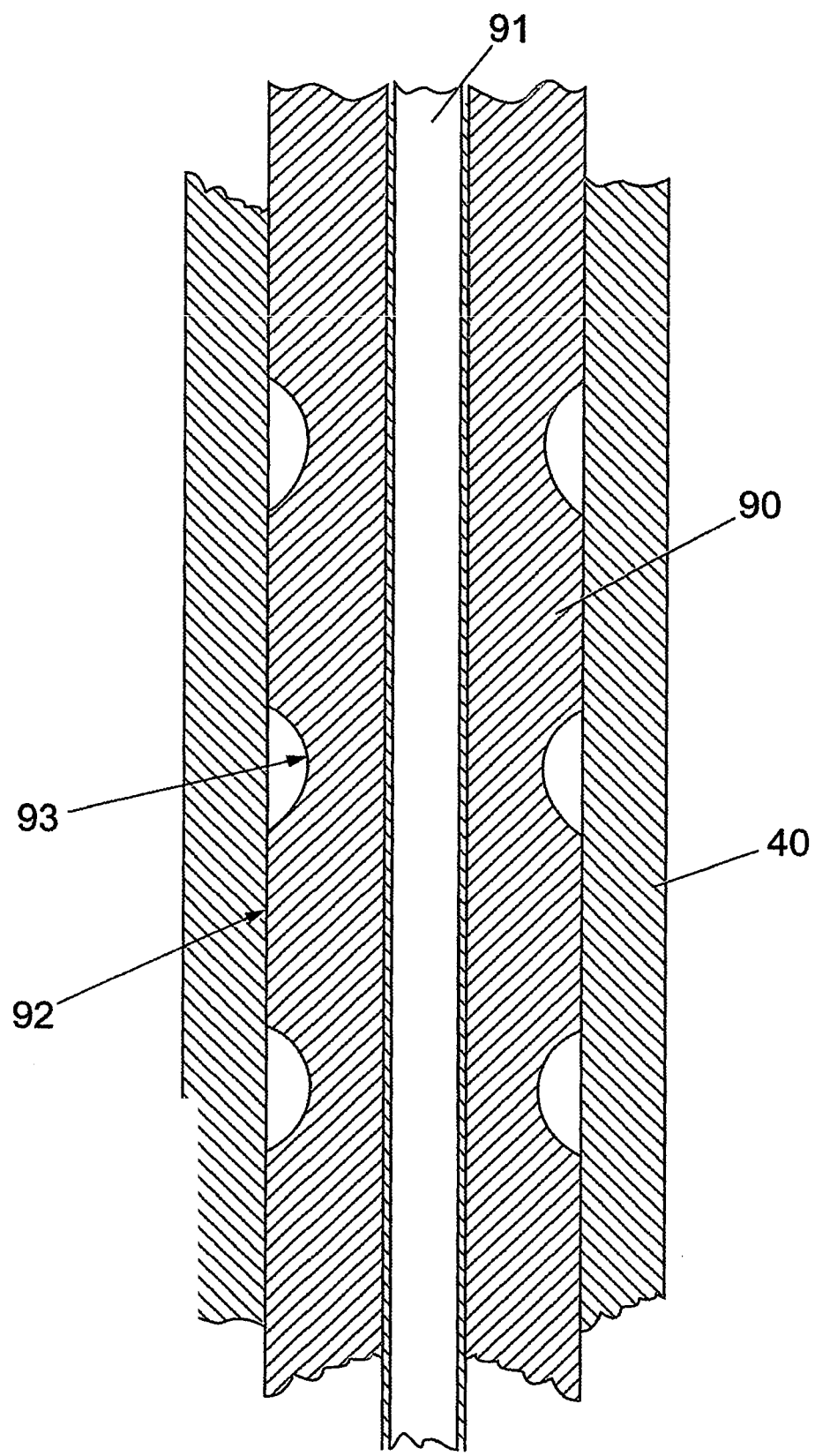
FIG. 10 shows a cross-sectional view of the mounting means for the wind turbine according to the present invention, wherein the interior is provided with a vibration damping core.

In FIG. 10 a possible embodiment of the interior of the mounting means is shown, in cross-section. In this embodiment, the mounting means is tubular in cross-section. The mounting means 40 comprises a hollow core wherein a cylindrical core element 90 is present. The core element 90 in the middle thereof is provided with a hollow section 91 in order to allow elements such as a power line to be guided through the interior of the core element 90. The core element 90 is provided with sections 92 with an exterior diameter corresponding substantially to the interior diameter of the mounting means 40. These sections alternate with sections 93 that have a reduced diameter and are not in contact with the mounting means' 40 inner radial surface. The sandwich mounting bracket together with the mounting means core design suppresses vibrations in the system. The main sources for those vibrations are vibrations transmitted from the wind turbine to the building, and the aerodynamic turbulence around obstacles, which decreases power output but more importantly shortens the working life of the wind turbine.

Figure 11:
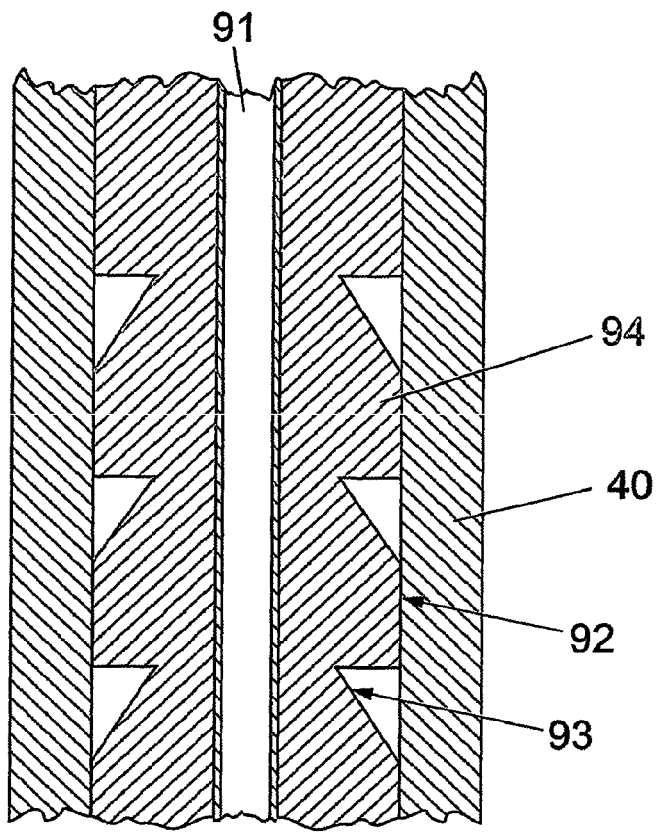
FIGS. 11 and 12 show a cross-sectional view of the mounting means according to FIG. 10 as alternative embodiments for the vibration damping core.

In FIG. 11 an alternative embodiment of the interior of the mounting means is shown, in cross-section. The hollow core of the mounting means 40 is provided with a core element 94. The core element 94 in the middle thereof is provided with a hollow section 91.

The core element 94 is provided with sections 92 with an exterior diameter corresponding substantially to the interior diameter of the mounting means 40. These sections alternate with sections 93 that have a reduced diameter and are not in contact with the mounting means' 40 inner radial surface. When comparing FIGS. 10 and 11 it will be clear that the shape of the recesses in respective core elements 90 and 94 differs. It should be noted that FIGS. 10 and 11 are for illustration purposes only. Alternative embodiments for the core elements are also possible.

Figure 12:
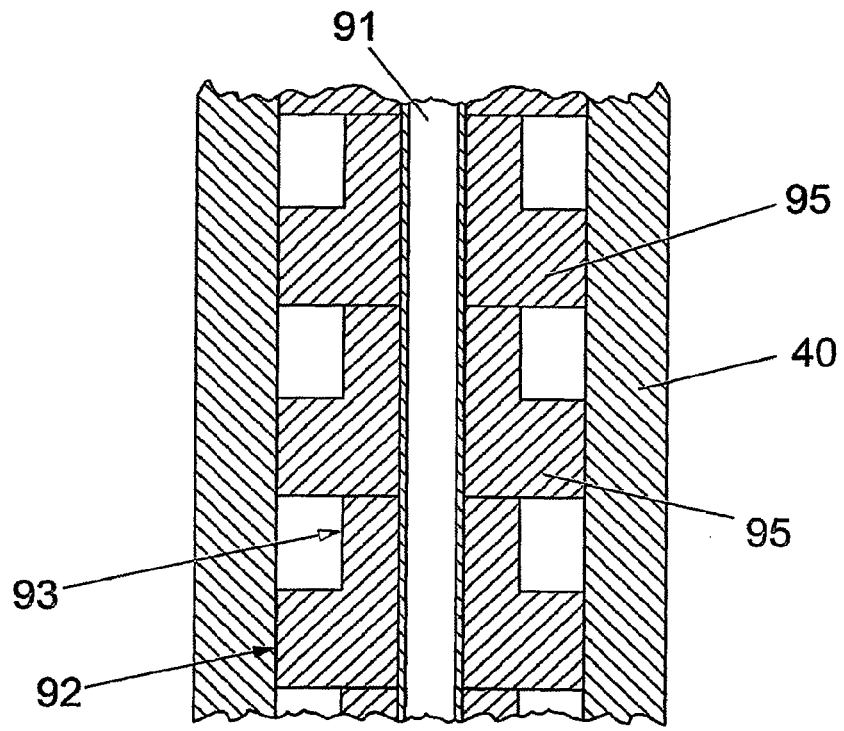

FIG. 12 shows a further embodiment of the interior of the mounting means 40. As shown in FIG. 12, the interior of the mounting means 40 comprises several core elements 95, which are inserted in the mounting means wherein a first element 95 abuts an adjacent element 95. In the example of FIG. 12 the shape of the recesses in the respective elements 95 again differs from the embodiments according to FIG. 10 and FIG. 11.

In a wind turbine noise comes from two areas, aerodynamic sources and mechanical sources. Aerodynamic noise is radiated from the blades, originating due to the interaction of the blade surfaces with turbulence and natural atmospheric or viscous flow in the boundary layer around the blades. Mechanical noise is due to the relative motion of mechanical components and the dynamic response among them. This effect may be magnified if the nacelle, rotor and tower transmit the mechanical noise and radiate it, acting as a loudspeaker. Two types of noise problem exist: air borne noise which is noise which is transmitted directly from the component surface or interior into the air, and structure borne noise which is transmitted through the structure before being radiated by another component.

The turbine mounting and mounting means are designed to push the resonant frequency of the whole structure out-with the operation vibration frequencies caused by blade unbalances, aerodynamic induced vibrations, mechanical induced vibrations and deformations. The mounting contains a damping system which eliminates vibrations.

Figure 13:
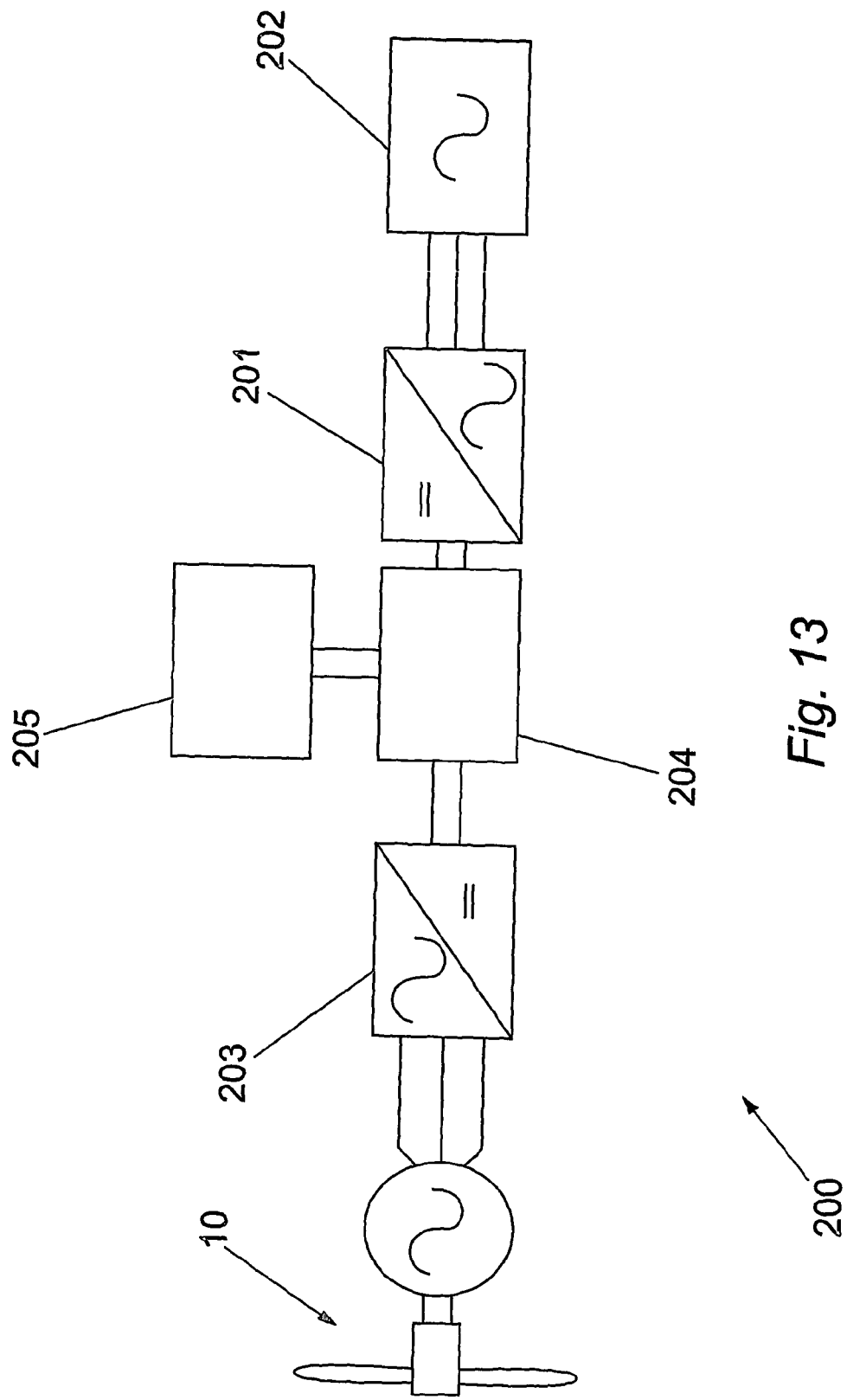
FIG. 13 shows a schematic block diagram of a wind turbine system in accordance with the fourth aspect of the invention.

As shown in FIG. 13, the wind turbine 10 can form part of a wind turbine system 200 which can be connected to a stand alone or grid-tie inverter 201 for connection to local power infrastructure, or to a local or embedded grid connection 202. The system 200 can also be provided with a rectifier 203 which rectifies the power output from the wind turbine 10 and feeds the rectified power to an electronic controller 204 (as described in previous embodiments) which can either "dump" excess load 205 (which may be done as described above for other embodiments by way of an external resistive load) or supply power to the inverter 201. In this way the wind turbine system 200 can be utilised to feed power to power infrastructure such as a local grid network or the national grid.

Figure 14:
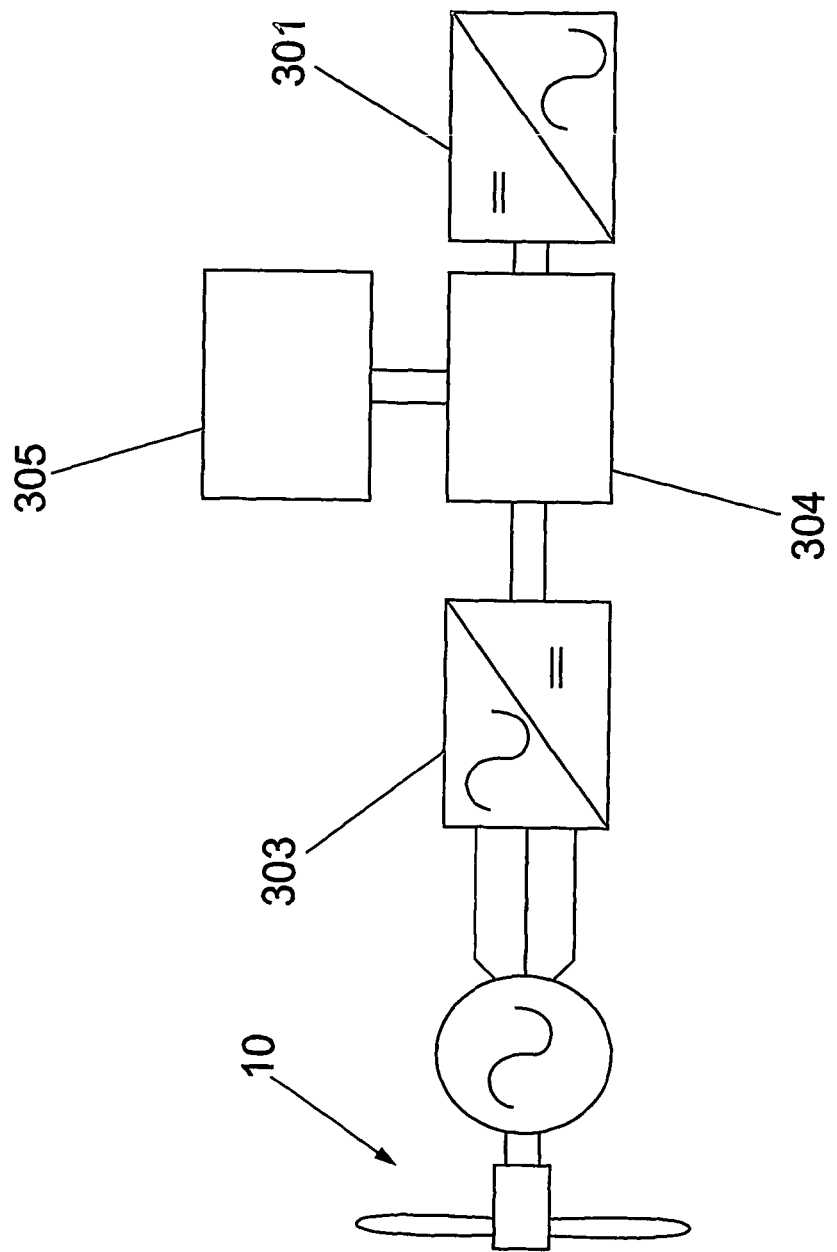
FIG. 14 shows a schematic block diagram of a wind turbine system in accordance with the fifth aspect of the invention.

As shown in FIG. 14, the wind turbine 10 can form part of a wind turbine system 300 which can be connected to an energy storage device 301. The storage device may be in the form of battery packs, or any other suitable form of energy storage device. The system 300 can also be provided with a rectifier 303 which rectifies the power output from the wind turbine 10 and feeds the rectified power to an electronic controller 304 (which may be done as described above for other embodiments by way of an external resistive load) which can either "dump" excess load,305 (which may be done as described above for other embodiments) or supply power to the storage device 301. In this way the wind turbine system 200 can be utilised to feed power to a storage device for later use.

Modifications and improvements may be made to the foregoing without departing from the scope of the invention.

The invention claimed is:

1. A rotor for a roof-mounted wind turbine comprising a plurality of radial blades and a ring-shaped diffuser connected to the outer tips of the blades, wherein the diffuser is an aerofoil diffuser and is configured such that it inhibits the partly axial and partly radial airflow from the blades, said airflow becoming circumferential when it contacts the aerofoil diffuser, thereby reducing acoustic emissions.

2. A rotor according to claim 1, wherein the aerofoil diffuser extends downstream from the outer tips of the blades.

3. A rotor according to claim 1, wherein the outer tips of the blades are connected to the diffuser at or near to the leading edge of the diffuser.

4. A rotor according to claim 1, wherein the aerofoil diffuser tapers outwards from the outer tips of the blades to form a substantially frusto-conical diffuser; the rotational axis of the frusto-conical diffuser is substantially aligned to the rotational axis of the blades.

5. A rotor according to claim 1, wherein at least a portion of the aerofoil diffuser extends upstream from the outer tips of the blades.

6. A rotor according to claim 1, wherein the aerofoil diffuser tapers radially outwards as it extends from the upstream end to the downstream end.

7. A rotor according to claim 1, wherein the aerofoil diffuser is shaped to inhibit partly axial and partly radial airflow from the outer tips of the blades and divert said airflow to substantially circumferential airflow during normal operation.

8. A rotor according to claim 1, wherein the blades are inclined at an angle relative to a transverse rotor plane perpendicular to the rotational axis of the rotor.

9. A rotor according to claim 8, wherein the angle of inclination may vary along the length of the blade.

10. A rotor according to claim 8, wherein the angle of inclination of each blade is greater at an intermediate portion of the blade than at the outer tip of the blade.

11. A rotor according to claim 1, wherein the blades are substantially parallel to the transverse rotor plane at the outer tip of the blades.

12. A wind turbine comprising a rotor according to claim 1, further comprising a nacelle and a mounting means configured to allow rotation of the turbine and rotor about a directional axis perpendicular to the rotational axis, thus allowing the turbine to be oriented in the optimum direction depending on wind conditions.

13. A wind turbine according to claim 12, further comprising a furling means configured to rotate the rotor about the directional axis so that the rotational axis is not parallel to the direction of airflow when the airflow speed is greater than a predetermined airflow speed.

14. A wind turbine according to claim 12, wherein the furling means comprises a non-linear furling means configured to provide no furling over a first lower range of airflow speed and a varying degree of furling over a second higher range of airflow speed.

15. A wind turbine according to claim 13, wherein the furling means comprises at least two tail fins extending downstream of the diffuser.

16. A wind turbine according to claim 15, wherein the two tail fins are provided diametrically opposite each other.

17. A wind turbine according to claim 15, wherein one of the tail fins is a moveable tail fin hingedly mounted for rotation about a tangential hinge line.

18. A wind turbine according to claim 17, wherein the moveable tail fin may be mounted on a mounting boom and the hinge line may be provided: at the connection point of the mounting boom and the nacelle, so that the mounting boom also rotates; at the connection between the mounting boom and the moveable tail fin so that only the moveable tail fin rotates; or at any point along the length of the mounting boom.

19. A wind turbine according to claim 17, wherein the tail fin rotates about a horizontal axis under high winds resulting in a fin which folds about a horizontal axis.

20. A wind turbine according to claim 17, wherein the moveable tail fin is rotationally biased by biasing means to an at-rest position in which the leading edge of the moveable tail fin is closer to the axis of rotation of the rotor than the trailing edge of the moveable tail fin, such that the moveable tail fin is angled at an at-rest attack angle to the axis of rotation of the rotor.

21. A wind turbine according to claim 20, wherein the biasing means is non-linear.

22. A wind turbine according to claim 20, wherein the biasing means is adapted to hold the moveable tail fin in the at-rest position until the airflow speed reaches a predetermined speed and is further adapted such that as the airflow speed increases beyond the predetermined speed the moveable fin rotates and the attack angle decreases, resulting in unbalanced aerodynamic loading on the wind turbine, such that the wind turbine rotates about its mounting axis to a furled position.

23. A wind turbine according to claim 12 comprising means for reducing he operating vibrations caused by harmonic resonance within the turbine, tower and mounting structure.

24. A wind turbine according to claim 23, wherein the wind turbine is provided with a nacelle damping system configured to at least partially isolate the vibrations in the generator and turbine from the tower.

25. A wind turbine according to claim 23, wherein the wind turbine is provided with mounting brackets for mounting the turbine on a surface, the brackets having a sandwich construction of visco-elastic materials and structural materials.

26. A wind turbine according to claim 23, wherein the mounting means is tubular.

27. A wind turbine according to claim 25, wherein the tower contains one or more cores of flexible material, such as rubber, with sections with a reduced diameter, which are not in contact with the tower's inner radial surface, such that the reduced diameter sections alternate with normal sized sections, which are in contact with the tower's inner surface thus serving to absorb vibrations in the tower through the energy dissipated in the flexible core before they reach the mounting brackets.

28. A wind turbine according to claim 27, wherein the rubber core is configured to control the system's resonant frequency out-with the turbine driving frequency by absorption of a range of vibration frequencies.

29. A wind turbine according to claim 28, wherein the cross-sectional shape and length of each of the reduced diameter sections is configured to "tune" the system to remove a range of vibration frequencies from the mounting structure.

30. A rotor for a roof-mounted wind turbine comprising a plurality of radial blades and a ring-shaped diffuser located radially outward from the outer tips of the blades, the blades being connected to an inner surface of the diffuser at a location near a leading edge of the diffuser, wherein the diffuser is an aerofoil diffuser and is configured such that it inhibits the partly axial and partly radial airflow from the blades, said airflow becoming circumferential when it contacts the aerofoil diffuser, thereby reducing acoustic emissions, wherein the diffuser extends axially rearward from the location where the blades connect to the diffuser.

31. A rotor according to claim 30 wherein the diffuser also extends radially outward as it extends axially rearward from the location where the blades connect to the diffuser.

* * * * *